US012741624B2

(12) United States Patent
Vilaetis et al.

(10) Patent No.: US 12,741,624 B2
(45) Date of Patent: Sep. 22, 2026

(54) BRAKE CONTROL APPARATUS FOR A VEHICLE TRAIN AND METHODS THEREFOR

(71) Applicant: Bendix Commercial Vehicle Systems LLC, Avon, OH (US)

(72) Inventors: Konstantinos Vilaetis, Lakewood, OH (US); Nicholas A. Broyles, North Ridgeville, OH (US); Andrew J. Pilkington, Avon Lake, OH (US)

(73) Assignee: Bendix Commercial Vehicle Systems LLC, Avon, OH (US)

(*) Notice: Subject to any disclaimer, the term of this patent is extended or adjusted under 35 U.S.C. 154(b) by 100 days.

(21) Appl. No.: 18/786,992

(22) Filed: Jul. 29, 2024

(65) Prior Publication Data

US 2026/0028009 A1 Jan. 29, 2026

(51) Int. Cl.
*B60T 17/22* (2006.01)
*B60T 11/28* (2006.01)

(52) U.S. Cl.
CPC ............... *B60T 17/22* (2013.01); *B60T 11/28* (2013.01); *B60T 2270/402* (2013.01); *B60T 2270/406* (2013.01); *B60T 2270/413* (2013.01); *Y10S 303/01* (2013.01)

(58) Field of Classification Search
CPC ...... B60T 17/22; B60T 17/221; B60T 17/222; B60T 17/223; B60T 11/28; B60T 2270/402; Y10S 303/01; Y10S 303/02; Y10S 303/03
See application file for complete search history.

(56) References Cited

U.S. PATENT DOCUMENTS 4,946,229 A * 8/1990 Deno .................... B60T 17/228 303/33
5,090,779 A 2/1992 Kramer
6,050,650 A * 4/2000 Hart ...................... B60T 15/027 303/20
9,227,607 B1 1/2016 Ripley
10,149,348 B2 12/2018 Dieckmann
(Continued)

FOREIGN PATENT DOCUMENTS

AU 2015202191 A1 * 5/2015
DE 19902777 A1 * 7/2000 .......... B61L 15/0054
(Continued)

OTHER PUBLICATIONS

European Patent Office, "International Search Report and Written Opinion," report, Nov. 21, 2025, 7 pages, European Patent Office Rijswijk Netherlands.

*Primary Examiner* — Erin M Piateski
*Assistant Examiner* — Ashley Tiffany Schoech
(74) *Attorney, Agent, or Firm* — Cheryl L. Greenly; Brian E. Kondas; Geoffrey A. Kudlo

(57) ABSTRACT

A brake control apparatus is provided for a vehicle train having a tractor and one or more towed vehicles coupled to the tractor. The brake control apparatus comprises a tractor controller arranged to detect a pressure change in at least one brake line of the vehicle train in response to a brake trigger signal. The tractor controller is also arranged to process the detected pressure change to estimate a combination of the number of the towed vehicles and a total length of the number of towed vehicles coupled to the tractor.

18 Claims, 18 Drawing Sheets

(56) References Cited

U.S. PATENT DOCUMENTS

| | | | | |
|---|---|---|---|---|
| 2002/0124891 | A1* | 9/2002 | Frank | F15B 13/0857 137/596 |
| 2009/0280959 | A1* | 11/2009 | Bensch | B60T 8/361 477/198 |
| 2015/0027113 | A1* | 1/2015 | Biller | F15B 7/003 60/545 |
| 2017/0366228 | A1 | 12/2017 | Bobrek | |
| 2018/0354475 | A1* | 12/2018 | Carritte | B60T 8/38 |
| 2020/0223414 | A1* | 7/2020 | Brütt | B60T 13/263 |
| 2021/0284109 | A1 | 9/2021 | Brutt | |
| 2024/0075911 | A1* | 3/2024 | Dandoy | B60T 7/128 |
| 2024/0198994 | A1* | 6/2024 | Laskawy | B60T 17/221 |

FOREIGN PATENT DOCUMENTS

| | | | | |
|---|---|---|---|---|
| DE | 10009324 | A1 * | 9/2001 | B60T 17/228 |
| DE | 10112920 | A1 * | 9/2002 | B61L 15/0054 |
| DE | 102004028390 | A1 | 2/2006 | |
| EP | 1288095 | A2 * | 3/2003 | B60T 13/662 |
| EP | 2547568 | B1 * | 5/2016 | B61L 15/0054 |
| EP | 3318493 | A1 | 5/2018 | |
| RU | 2725834 | C1 * | 7/2020 | G01L 5/28 |

* cited by examiner

BRAKE CONTROL APPARATUS FOR A VEHICLE TRAIN AND METHODS THEREFOR

BACKGROUND

The present application relates to vehicle trains, and is particularly directed to a brake control apparatus for a vehicle train and methods therefor, such as for a vehicle train having a tractor and one or more towed vehicles coupled to the tractor.

In a typical vehicle train having a tractor and a plurality of towed vehicles coupled to the tractor, service brakes and parking brakes are sometimes tuned based upon the maximum number of towed vehicles that can be coupled to the tractor or the maximum load the vehicle train is expected to carry.

A drawback in tuning the service brakes and the parking brakes based upon the maximum number of towed vehicles is that braking performance is less than optimal when the actual number of towed vehicles is less than the maximum number of towed vehicles that can be coupled to the tractor.

Similarly, a drawback in tuning the service brakes and the parking brakes based upon the maximum expected load is that braking performance is less than optimal when the vehicle train is carrying a load that is much less than the maximum expected load. For example, no towed vehicle may be coupled to the tractor, but yet the service brakes and the parking brakes for the tractor (which is carrying no load) are tuned for the maximum expected load.

Despite advances already made, those skilled in the art continue with research and development efforts in the field of tuning service brakes and parking brakes of a vehicle train, such as a vehicle train having a tractor and a plurality of towed vehicles coupled to the tractor.

SUMMARY

In accordance with one embodiment, a brake control apparatus is provided for a vehicle train having a tractor and one or more towed vehicles coupled to the tractor. The brake control apparatus comprises a tractor controller arranged to detect a pressure change in at least one brake line of the vehicle train in response to a brake trigger signal. The tractor controller is also arranged to process the detected pressure change to estimate a combination of the number of the towed vehicles and a total length of the number of towed vehicles coupled to the tractor.

In accordance with another embodiment, a brake control apparatus is provided for a vehicle train having a tractor and one or more towed vehicles coupled to the tractor. The brake control apparatus comprises a brake line extending between the tractor and the one or more towed vehicles. The brake control apparatus further comprises a tractor controller arranged to apply a pressure pulse in the brake line. The tractor controller is also arranged to detect a reflected pressure pulse in the brake line in response to the applied pressure pulse, and determine the number of towed vehicles coupled to the tractor based upon the reflected pressure pulse detected in the brake line.

In accordance with yet another embodiment, a method is provided of operating a vehicle train having a tractor and one or more towed vehicles coupled to the tractor. The method comprises providing a pressure change in a brake line that extends between the tractor and the one or more towed vehicles coupled to the tractor. The method also comprises detecting the pressure change provided in the brake line. The method further comprises determining a combination of towed vehicle length and the number of towed vehicles coupled to the tractor based upon the detected pressure change.

DETAILED DESCRIPTION

The present application is directed to a brake control apparatus for a vehicle train and methods therefor, such as for a vehicle train having a tractor and one or more towed vehicles coupled to the tractor. The specific construction of the brake control apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
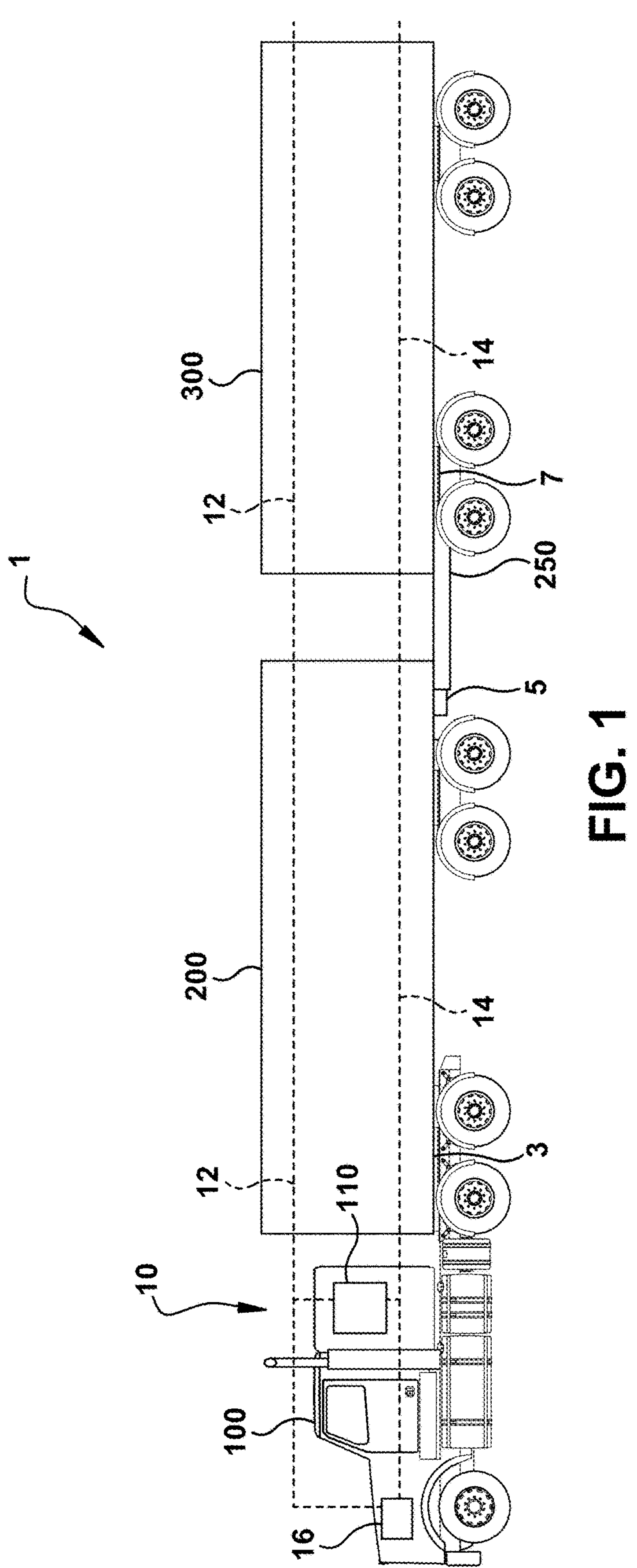
FIG. 1 is a pictorial diagram of a vehicle train embodying an example brake control apparatus constructed in accordance with the present disclosure.

Referring to FIG. 1, a pictorial diagram is illustrated of a vehicle train 1 embodying an example brake control apparatus 10 constructed in accordance with the present disclosure. The vehicle train 1 has a tractor 100 and one or more towed vehicles including first trailer 200, dolly 250, and second trailer 300 coupled to the tractor 100. A mechanical coupling 3 mechanically interconnects the tractor 100 and the first trailer 200 in known and conventional manner. The dolly 250 includes a hook portion 5 that connects to rear end of the first trailer 200, and a plate portion 7 that connects to front end of the second trailer 300. The dolly 250 mechanically interconnects the first trailer 200 and the second trailer 300 in known and conventional manner.

Although the above description describes three towed vehicles (i.e., the first trailer 200, the dolly 250, and the second trailer 300) coupled to the tractor 100, it is conceivable that any number of towed vehicles (including zero towed vehicles) can be coupled to the tractor 100. As another example, five towed vehicles (i.e., three trailers and two dollies) may be coupled to the tractor 100.

The brake control apparatus 10 includes an electronic controller unit (ECU) 110 of the tractor 100. The ECU 110 is referred to herein as "tractor controller 110". The tractor controller 110 is pneumatically connected to a parking brake line 12, and is pneumatically connected to a service brake line 14. Each of the parking brake line 12 and the service brake line 14 is pneumatically connected to a brake controller 16 of the vehicle train 1. The brake controller 16 controls in known and conventional manner the pneumatic pressure in the parking brake line 12 to provide parking brakes for the vehicle train 1, and the pneumatic pressure in the service brake line 14 to provide service brakes for the vehicle train 1, and therefore, will not be further described.

Network communication between controllers may comprise a controller area network (CAN) bus to which a number of vehicle devices are connected to communicate with each other. The CAN bus may be in a standardized serial communication format, such as SAE J1939, or in a proprietary format. The communication path may or may not be shown or described herein via wired (e.g., controller area network (CAN), ethernet, automotive ethernet, etc.) or wireless (e.g., Wi-Fi, Bluetooth, cellular, etc.) connections. Other types of network communication are possible.

Figure 2A:
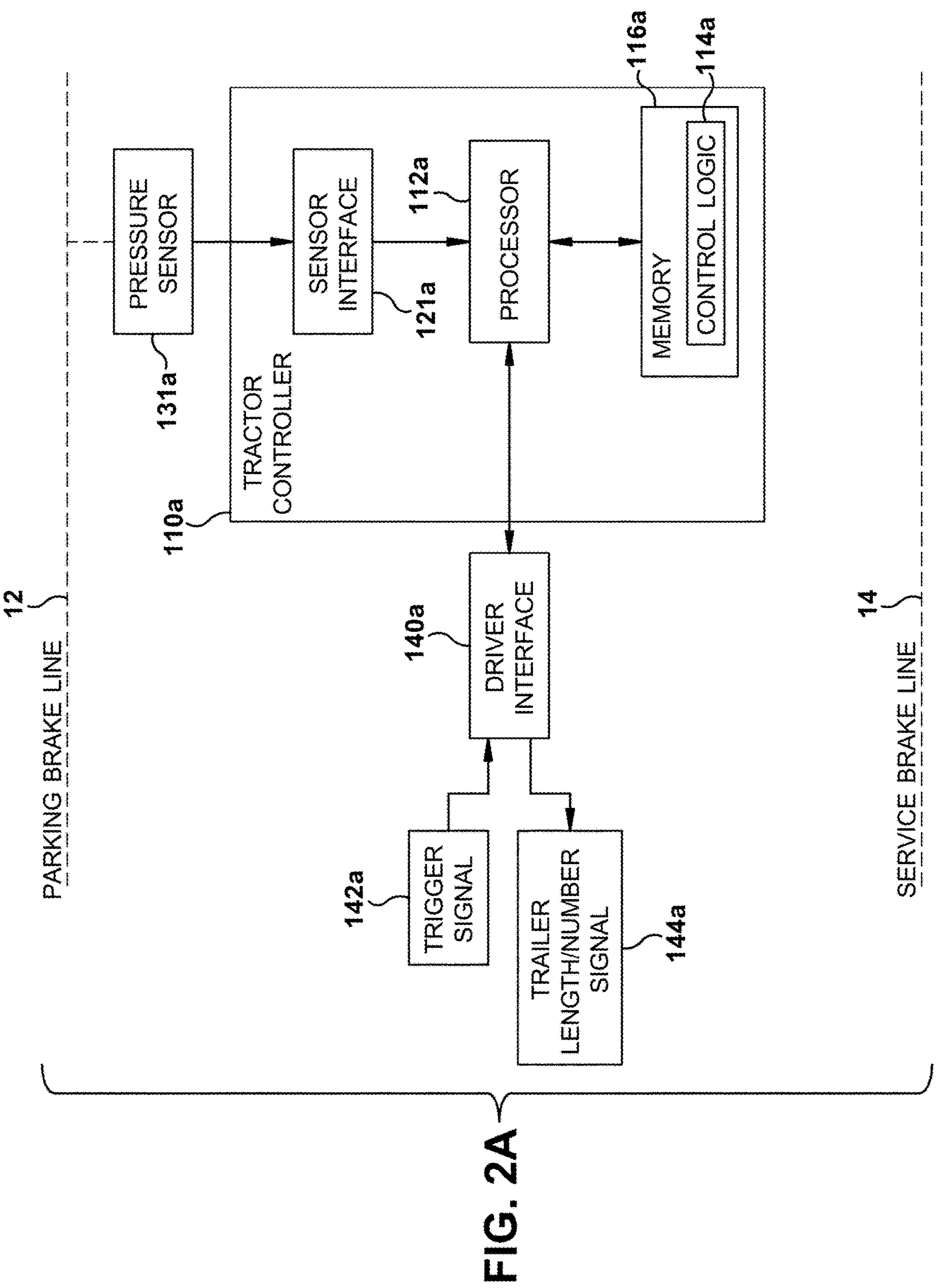
FIGS. 2A-2I are schematic block diagrams of example tractor controllers used in the brake control apparatus of FIG. 1.

Referring to FIG. 2A, a schematic block diagram of an example tractor controller 110*a* (corresponding to tractor controller 110 of FIG. 1) in accordance with an embodiment is illustrated. Tractor controller 110*a* includes processor 112*a* that executes instructions of control logic 114*a* stored in internal memory 116*a*, external memory (not shown), or a combination thereof. Processor 112*a* may comprise any type of technology. For example, processor 112*a* may comprise a general-purpose electronic processor. Other types of processors and technologies are possible. Internal memory 116*a* may comprise any type of technology. For example, internal memory 116*a* may comprise random access memory (RAM), read only memory (ROM), solid state memory, or any combination thereof. Other types of memories and data storage technologies are possible.

Tractor controller 110*a* also includes vehicle sensor interface 121*a* that may comprise any type of technology. Sensor interface 121*a* enables communication between processor 112*a* and pressure sensor 131*a*, which is a transducer that detects pressure in parking brake line 12. Tractor controller 110*a* communicates with vehicle driver interface 140*a* that may comprise any type of technology. Driver interface 140*a* enables communication between processor 112*a* and any combination of driver input devices and driver output devices (not shown) located in the vehicle driver compartment.

Driver input devices may comprise a parking brake handle for enabling the vehicle driver to apply/release parking brakes of the vehicle train 1 (FIG. 1), and a foot pedal for enabling the vehicle driver to apply/release the service brakes of the vehicle train 1. Other types of driver input devices and technologies are possible. As shown in FIG. 2A, driver interface 140*a* receives trigger signal 142*a* (from either the parking brake handle or the foot pedal, for example) that is communicated to processor 112*a* for further processing.

Driver output devices may comprise a display for enabling the vehicle information from processor 112*a* to be presented to the vehicle driver in the vehicle driver compartment. As shown in FIG. 2A, processor 112*a* provides trailer length/number signal 144*a* via driver interface 140*a* to the display in the vehicle driver compartment. Trailer length/number signal 144*a* is indicative of a combination of the number of trailers and a total length of the number of trailers (e.g., the first trailer 200 and/or the second trailer 300 shown in FIG. 1) coupled to the tractor 100.

Figures 3A, 3B:
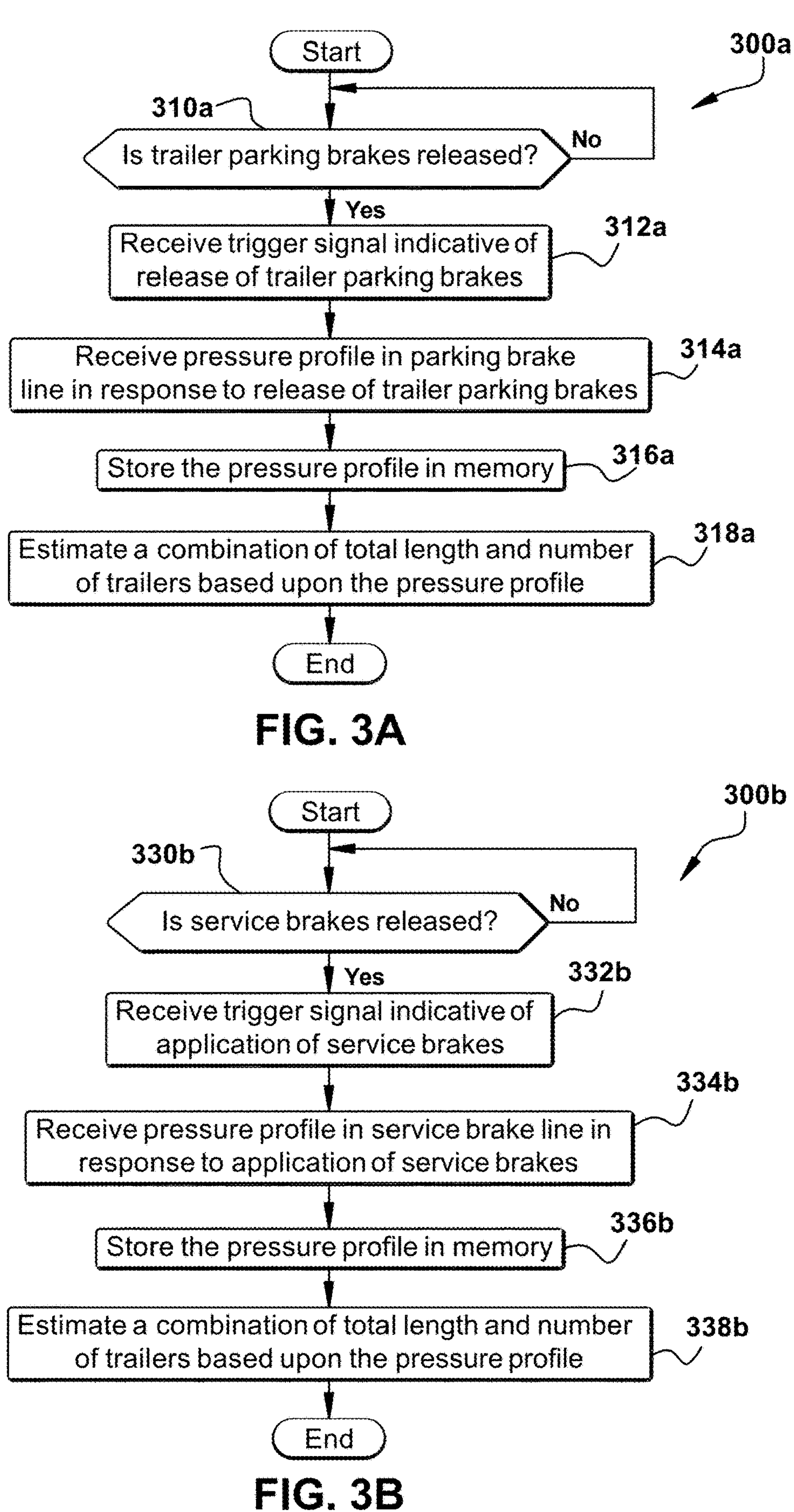
FIGS. 3A-3H are flow diagrams corresponding to the schematic block diagrams of FIGS. 2A-2H, respectively, depicting methods of operating the tractor controllers of FIGS. 2A-2H in accordance with different embodiments.

Referring to FIG. 3A, flow diagram 300*a* corresponds to the schematic block diagram of FIG. 2A, and depicts a method of operating tractor controller 110*a* of FIG. 2A in accordance with an embodiment. In block 310*a*, a determination is made as to whether trailer parking brakes of the vehicle train 1 is released. If the determination in block 310*a* is negative, the process returns loops back on itself to continue monitoring for a release of the trailer parking brakes. However, if the determination in block 310*a* is affirmative, the process proceeds to block 312*a*.

In block 312*a*, processor 112*a* receives trigger signal 142*a* via driver interface 140*a* indicative of release of the trailer parking brakes. Then in block 314*a*, processor 112*a* receives a pressure profile in parking brake line 12, via sensor interface 121*a* and pressure sensor 131*a*, in response to release of the trailer parking brakes. The pressure profile is stored in memory, such as memory 116*a*, as shown in block 316*a*. The process proceeds to block 318*a*.

In block 318*a*, an estimation is made of a combination of total length and number of trailers coupled to the tractor 100 based upon the pressure profile received. The estimation of the combination of total length and number of trailers may be presented via driver interface 140*a* as trailer length/number signal 144*a* to a display in the vehicle driver compartment for the vehicle driver to view. Trailer length/number signal 144*a* may also be communicated to other vehicle controllers, such as the brake controller 16 (FIG. 1), to enable tractor braking as well as trailer braking to be adjusted based upon the combination of total length and number of trailers coupled to the tractor 100, as indicated by trailer length/number signal 144*a*. The process of control logic 114*a* for tractor controller 110*a* then ends.

Figure 2B:
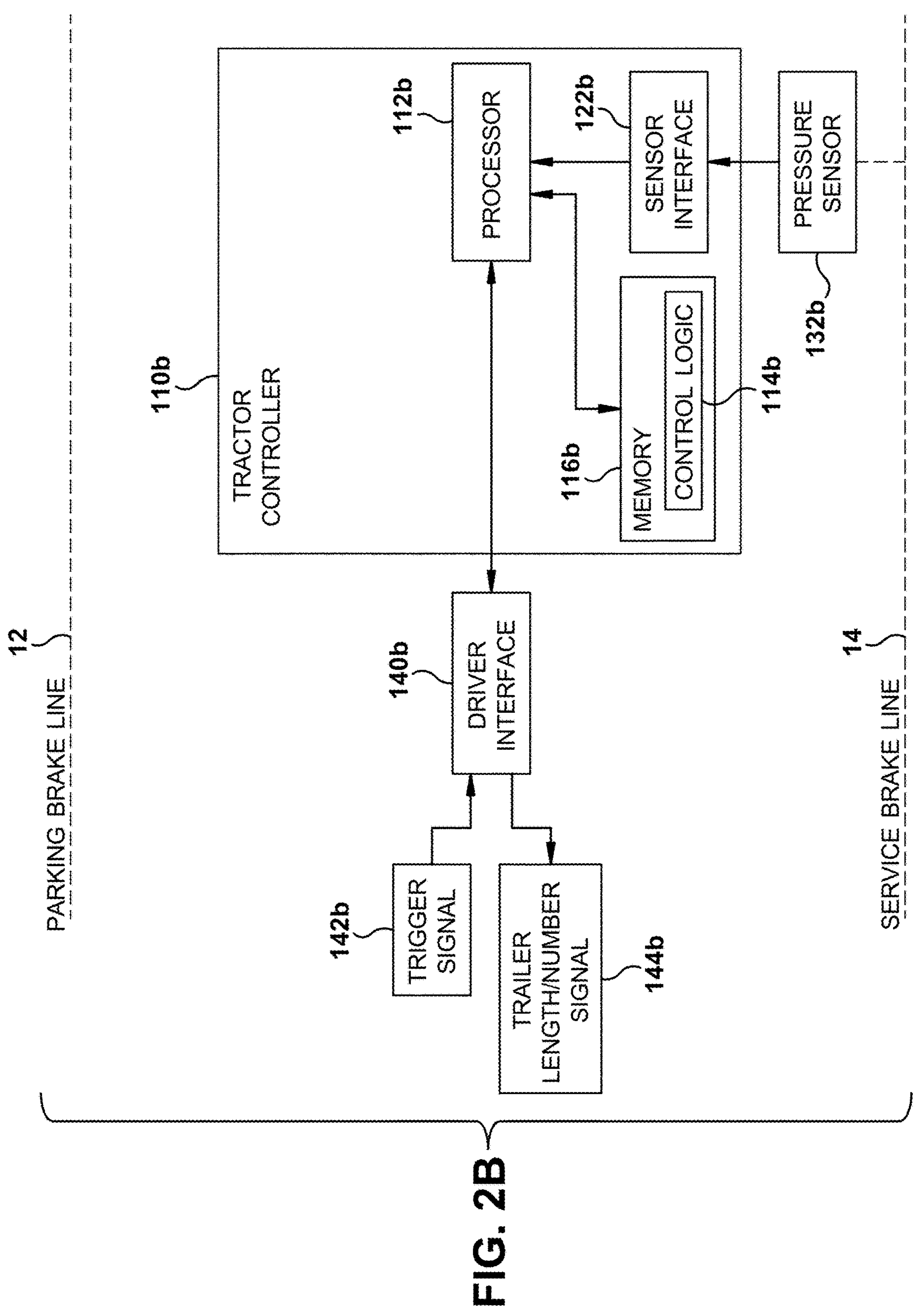

Referring to FIG. 2B, a schematic block diagram of an example tractor controller 110*b* (corresponding to tractor controller 110 of FIG. 1) in accordance with another embodiment is illustrated. Tractor controller 110*b* includes processor 112*b* that executes instructions of control logic 114*b* stored in internal memory 116*b*, external memory (not shown), or a combination thereof. Processor 112*b* may comprise any type of technology. For example, processor 112*b* may comprise a general-purpose electronic processor. Other types of processors and technologies are possible. Internal memory 116*b* may comprise any type of technology. For example, internal memory 116*b* may comprise random access memory (RAM), read only memory (ROM), solid state memory, or any combination thereof. Other types of memories and data storage technologies are possible.

Tractor controller 110*b* also includes vehicle sensor interface 122*b* that may comprise any type of technology. Sensor interface 122*b* enables communication between processor 112*b* and pressure sensor 132*b*, which is a transducer that detects pressure in service brake line 14. Tractor controller 110*b* communicates with vehicle driver interface 140*b* that may comprise any type of technology. Driver interface 140*b* enables communication between processor 112*b* and any combination of driver input devices and driver output devices (not shown) located in the vehicle driver compartment.

Driver input devices may comprise a parking brake handle for enabling the vehicle driver to apply/release parking brakes of the vehicle train 1 (FIG. 1), and a foot pedal for enabling the vehicle driver to apply/release the service brakes of the vehicle train 1. Other types of driver input devices and technologies are possible. As shown in FIG. 2B, driver interface 140*b* receives trigger signal 142*b* (from either the parking brake handle or the foot pedal, for example) that is communicated to processor 112*b* for further processing.

Driver output devices may comprise a display for enabling the vehicle information from processor 112*b* to be presented to the vehicle driver in the vehicle driver compartment. As shown in FIG. 2B, processor 112*b* provides trailer length/number signal 144*b* via driver interface 140*b* to the display in the vehicle driver compartment. Trailer length/number signal 144*b* is indicative of a combination of the number of trailers and a total length of the number of trailers (e.g., the first trailer 200 and/or the second trailer 300 shown in FIG. 1) coupled to the tractor 100.

Referring to FIG. 3B, flow diagram 300*b* corresponds to the schematic block diagram of FIG. 2B, and depicts a method of operating tractor controller 110*b* of FIG. 2B in accordance with an embodiment. In block 330*b*, a determination is made as to whether service brakes of the vehicle train 1 is applied. If the determination in block 330*b* is negative, the process returns loops back on itself to continue monitoring for an application of the service brakes. However, if the determination in block 330*b* is affirmative, the process proceeds to block 332*b*.

In block 332*b*, processor 112*b* receives trigger signal 142*b* via driver interface 140*b* indicative of application of the service brakes. Then in block 334*b*, processor 112*b* receives a pressure profile in service brake line 14, via sensor interface 122*b* and pressure sensor 132*b*, in response to application of the service brakes. The pressure profile is stored in memory, such as memory 116*b*, as shown in block 336*b*. The process proceeds to block 338*b*.

In block 338*b*, an estimation is made of a combination of total length and number of trailers coupled to the tractor 100 based upon the pressure profile received. The estimation of the combination of total length and number of trailers may be presented via driver interface 140*b* as trailer length/number signal 144*b* to a display in the vehicle driver compartment for the vehicle driver to view. Trailer length/number signal 144*b* may also be communicated to other vehicle controllers, such as the brake controller 16 (FIG. 1), to enable tractor braking as well as trailer braking to be adjusted based upon the combination of total length and number of trailers coupled to the tractor 100, as indicated by trailer length/number signal 144*b*. The process of control logic 114*b* for tractor controller 110*b* then ends.

Figure 2C:
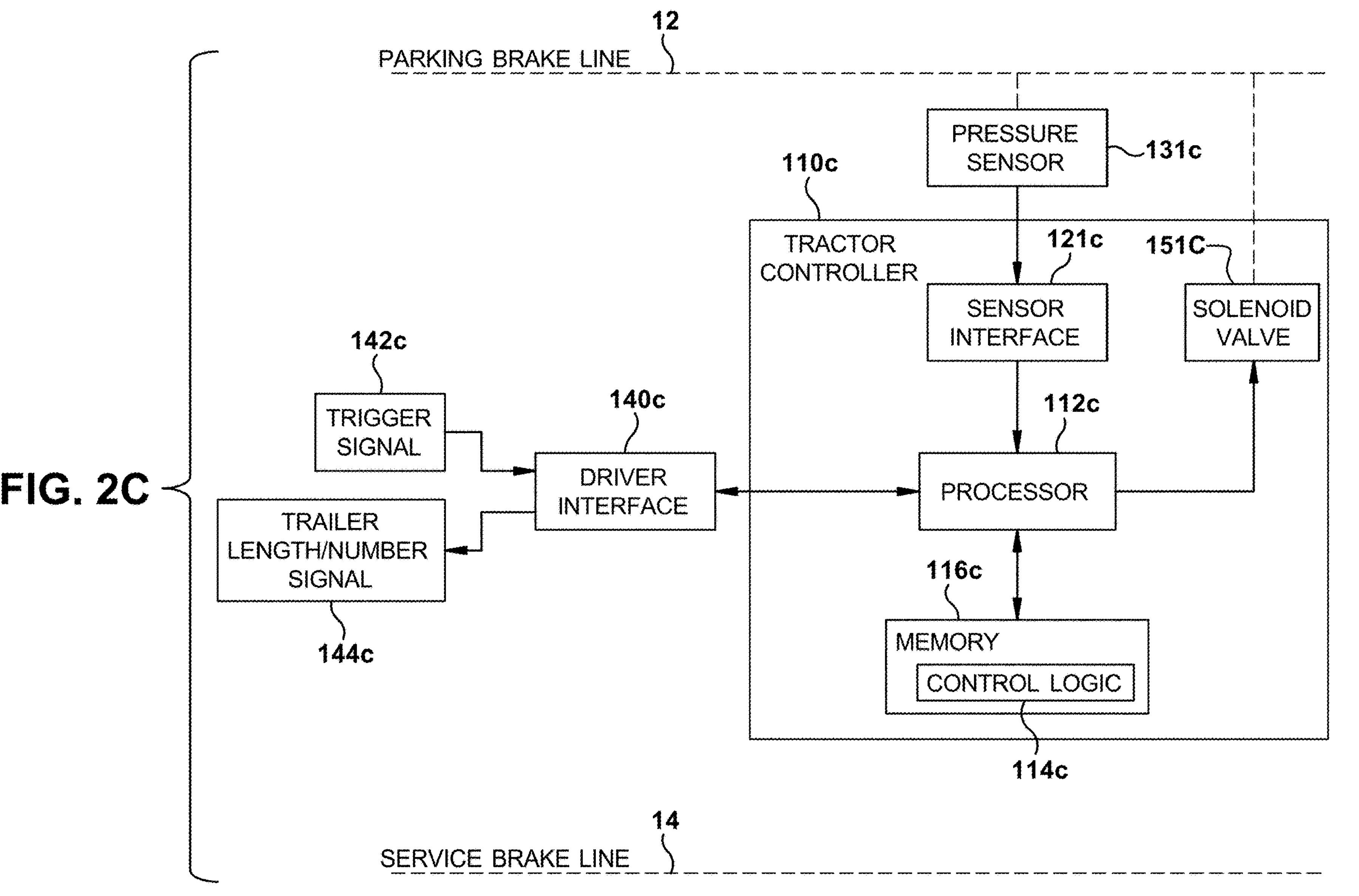

Referring to FIG. 2C, a schematic block diagram of an example tractor controller 110*c* (corresponding to tractor controller 110 of FIG. 1) in accordance with another embodiment is illustrated. Tractor controller 110*c* includes processor 112*c* that executes instructions of control logic 114*c* stored in internal memory 116*c*, external memory (not shown), or a combination thereof. Processor 112*c* may comprise any type of technology. For example, processor 112*c* may comprise a general-purpose electronic processor. Other types of processors and technologies are possible. Internal memory 116*c* may comprise any type of technology. For example, internal memory 116*c* may comprise random access memory (RAM), read only memory (ROM), solid state memory, or any combination thereof. Other types of memories and data storage technologies are possible.

Tractor controller 110*c* includes solenoid valve 151*c* pneumatically connected to parking brake line 12, and electrically connected to processor 112*c*. Solenoid valve 151*c* may comprise a traction valve of the vehicle train 1. Traction valves are known and conventional and, therefore, will not be described.

Tractor controller 110*c* also includes vehicle sensor interface 121*c* that may comprise any type of technology. Sensor interface 121*c* enables communication between processor 112*c* and pressure sensor 131*c*, which is a transducer that detects pressure in parking brake line 12. Tractor controller 110*c* communicates with vehicle driver interface 140*c* that may comprise any type of technology. Driver interface 140*c* enables communication between processor 112*c* and any combination of driver input devices and driver output devices (not shown) located in the vehicle driver compartment.

Driver input devices may comprise a parking brake handle for enabling the vehicle driver to apply/release parking brakes of the vehicle train 1 (FIG. 1), and a foot pedal for enabling the vehicle driver to apply/release the service brakes of the vehicle train 1. Other types of driver input devices and technologies are possible. As shown in FIG. 2C, driver interface 140*c* receives trigger signal 142*c* (from either the parking brake handle or the foot pedal, for example) that is communicated to processor 112*c* for further processing.

Driver output devices may comprise a display for enabling the vehicle information from processor 112*c* to be presented to the vehicle driver in the vehicle driver compartment. As shown in FIG. 2C, processor 112*c* provides trailer length/number signal 144*c* via driver interface 140*c* to the display in the vehicle driver compartment. Trailer length/number signal 144*c* is indicative of a combination of the number of trailers and a total length of the number of trailers (e.g., the first trailer 200 and/or the second trailer 300 shown in FIG. 1) coupled to the tractor 100.

Figure 3C:
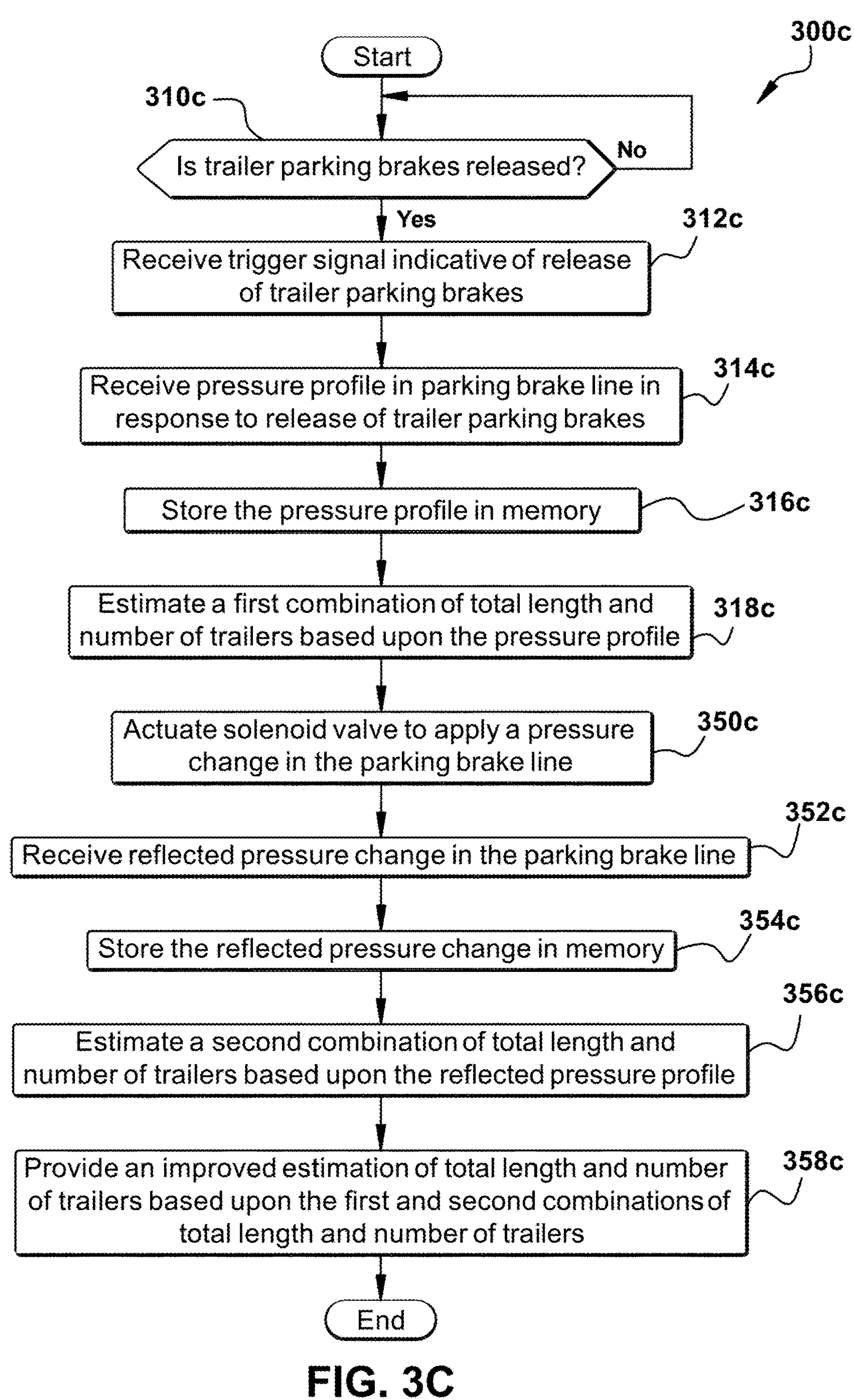

Referring to FIG. 3C, flow diagram 300*c* corresponds to the schematic block diagram of FIG. 2C, and depicts a method of operating tractor controller 110*c* of FIG. 2C in accordance with an embodiment. In block 310*c*, a determination is made as to whether trailer parking brakes of the vehicle train 1 is released. If the determination in block 310*c* is negative, the process returns loops back on itself to continue monitoring for a release of the trailer parking brakes. However, if the determination in block 310*c* is affirmative, the process proceeds to block 312*c*.

In block 312*c*, processor 112*c* receives trigger signal 142*c* via driver interface 140*c* indicative of release of the trailer parking brakes. Then in block 314*c*, processor 112*c* receives a pressure profile in parking brake line 12, via sensor interface 121*c* and pressure sensor 131*c*, in response to release of the trailer parking brakes. The pressure profile is stored in memory, such as memory 116*c*, as shown in block 316*c*. The process proceeds to block 318*c*.

In block 318*c*, an estimation is made of a first combination of total length and number of trailers coupled to the tractor 100 based upon the pressure profile received. The process then proceeds to block 350*c* in which solenoid valve 151*c* is actuated to provide a pressure change in the parking brake line 12 before proceeding to block 352*c*.

In block 352*c*, processor 112*c* receives a reflected pressure change in the parking brake line 12, via sensor interface 121*c* and pressure sensor 131*c*, in response to the applied pressure change in the parking brake line 12. The reflected pressure change is stored in memory, such as memory 116*c*, as shown in block 354*c*. The process proceeds to block 356*c*.

In block 356*c*, an estimation is made of a second combination of total length and number of trailers coupled to the tractor 100 based upon the reflected pressure change received. The process then proceeds to block 358*c* in which an improved estimation of total length and number of trailers coupled to the tractor 100 is provided. The improved estimation is based upon the first and second combinations of total length and number of trailers.

The improved estimation of total length and number of trailers may be presented via driver interface 140*c* as trailer length/number signal 144*c* to a display in the vehicle driver compartment for the vehicle driver to view. Trailer length/number signal 144*c* may also be communicated to other vehicle controllers, such as the brake controller 16 (FIG. 1), to enable tractor braking as well as trailer braking to be adjusted based upon the combination of total length and number of trailers coupled to the tractor 100, as indicated by trailer length/number signal 144*c*. The process of control logic 114*c* for tractor controller 110*c* then ends.

Figure 2D:
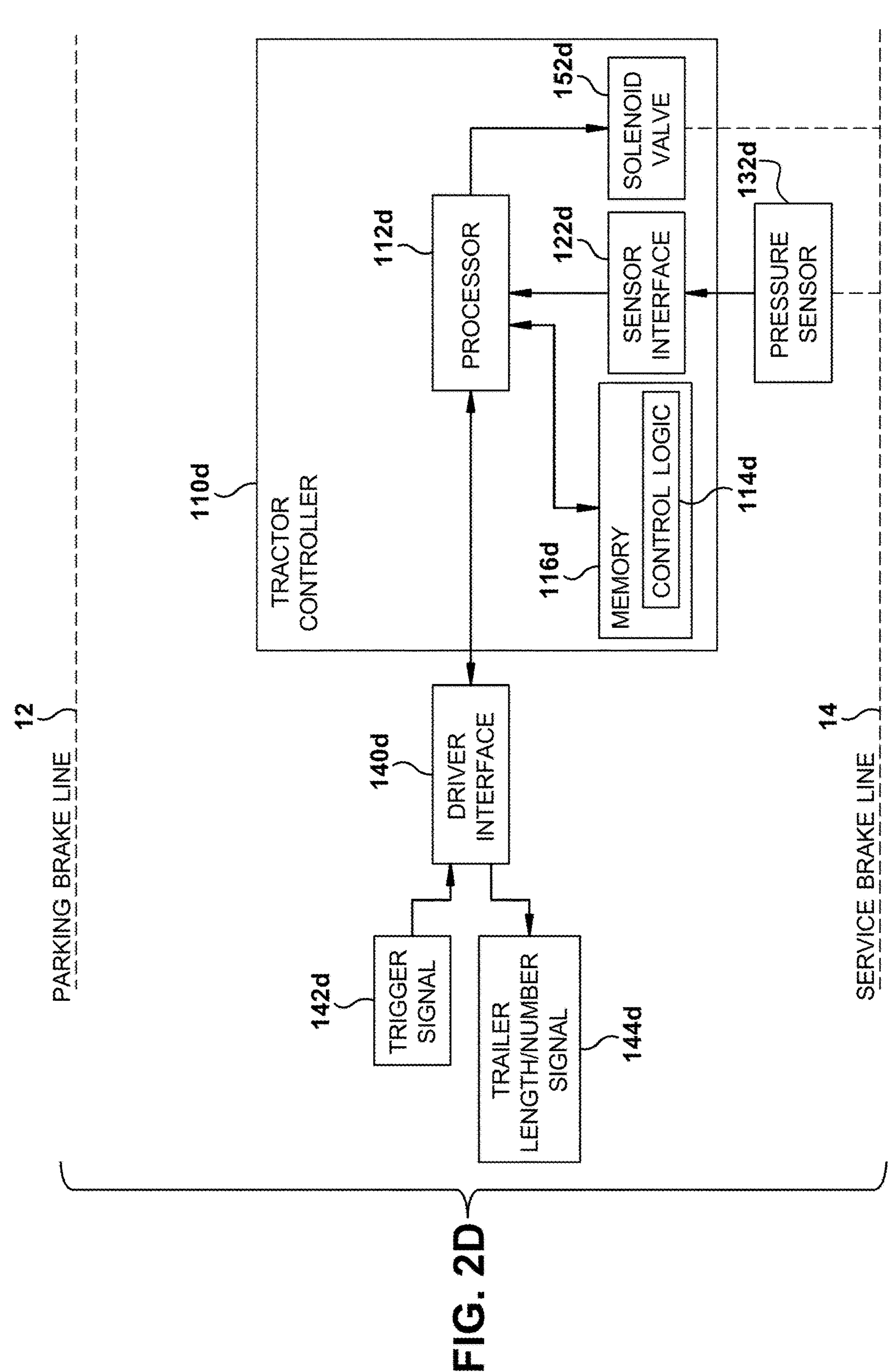

Referring to FIG. 2D, a schematic block diagram of an example tractor controller 110*d* (corresponding to tractor controller 110 of FIG. 1) in accordance with another embodiment is illustrated. Tractor controller 110*d* includes processor 112*d* that executes instructions of control logic 114*d* stored in internal memory 116*d*, external memory (not shown), or a combination thereof. Processor 112*d* may comprise any type of technology. For example, processor 112*d* may comprise a general-purpose electronic processor. Other types of processors and technologies are possible. Internal memory 116*d* may comprise any type of technology. For example, internal memory 116*d* may comprise random access memory (RAM), read only memory (ROM), solid state memory, or any combination thereof. Other types of memories and data storage technologies are possible.

Tractor controller 110*d* includes solenoid valve 152*d* pneumatically connected to service brake line 14, and electrically connected to processor 112*d*. Solenoid valve 152*d* may comprise a traction valve of the vehicle train 1. Traction valves are known and conventional and, therefore, will not be described.

Tractor controller 110*d* also includes vehicle sensor interface 122*d* that may comprise any type of technology. Sensor interface 122*d* enables communication between processor 112*d* and pressure sensor 132*d*, which is a transducer that detects pressure in service brake line 14. Tractor controller 110*d* communicates with vehicle driver interface 140*d* that may comprise any type of technology. Driver interface 140*d* enables communication between processor 112*d* and any combination of driver input devices and driver output devices (not shown) located in the vehicle driver compartment.

Driver input devices may comprise a parking brake handle for enabling the vehicle driver to apply/release parking brakes of the vehicle train 1 (FIG. 1), and a foot pedal for enabling the vehicle driver to apply/release the service brakes of the vehicle train 1. Other types of driver input devices and technologies are possible. As shown in FIG. 2D, driver interface 140*d* receives trigger signal 142*d* (from either the parking brake handle or the foot pedal, for example) that is communicated to processor 112*d* for further processing.

Driver output devices may comprise a display for enabling the vehicle information from processor 112*d* to be presented to the vehicle driver in the vehicle driver compartment. As shown in FIG. 2D, processor 112*d* provides trailer length/number signal 144*d* via driver interface 140*d* to the display in the vehicle driver compartment. Trailer length/number signal 144*d* is indicative of a combination of the number of trailers and a total length of the number of trailers (e.g., the first trailer 200 and/or the second trailer 300 shown in FIG. 1) coupled to the tractor 100.

Figure 3D:
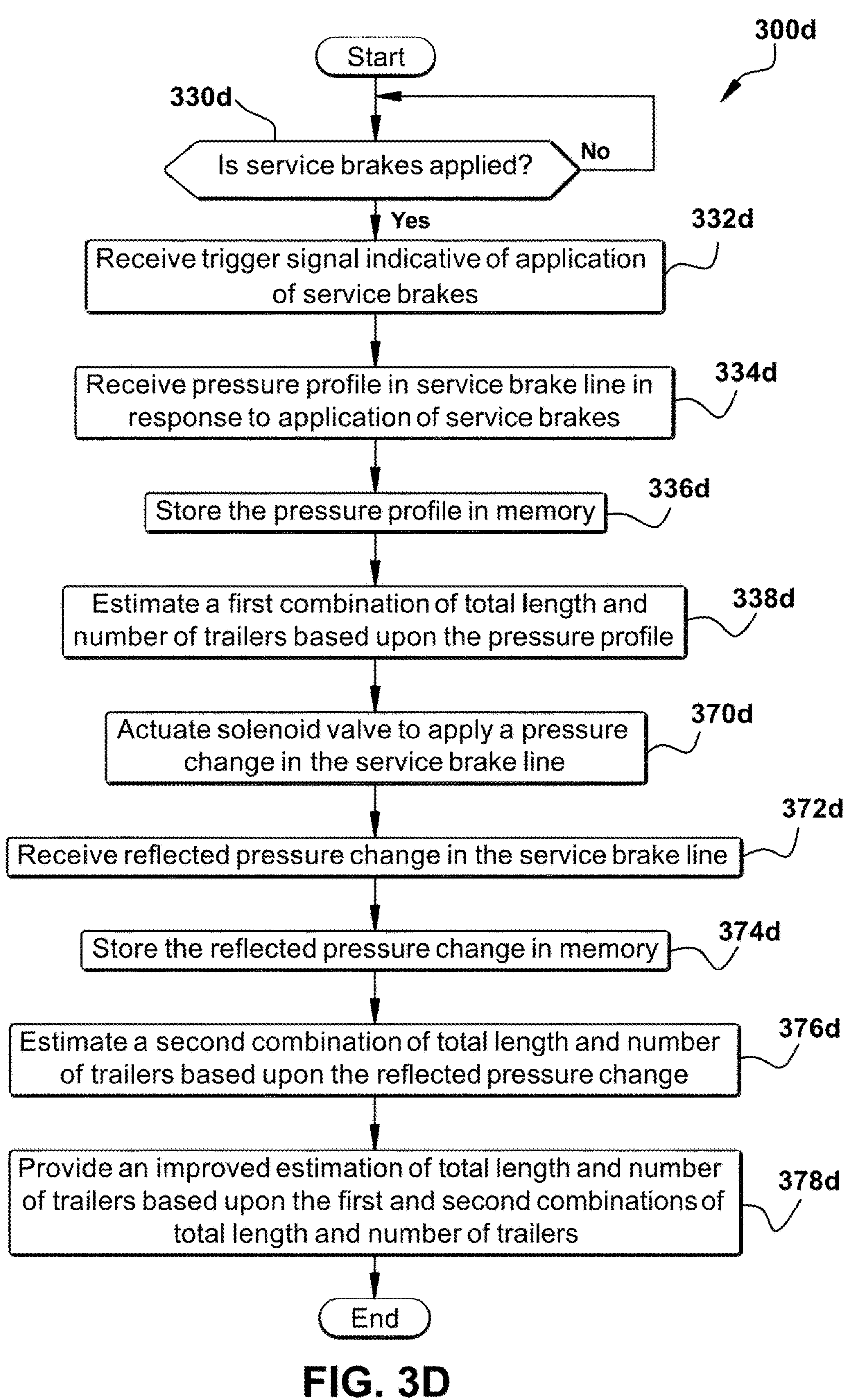

Referring to FIG. 3D, flow diagram 300*d* corresponds to the schematic block diagram of FIG. 2D, and depicts a method of operating tractor controller 110*d* of FIG. 2D in accordance with an embodiment. In block 330*d*, a determination is made as to whether service brakes of the vehicle train 1 is applied. If the determination in block 330*d* is negative, the process returns loops back on itself to continue monitoring for an application of the service brakes. However, if the determination in block 330*d* is affirmative, the process proceeds to block 332*d*.

In block 332*d*, processor 112*d* receives trigger signal 142*d* via driver interface 140*d* indicative of application of the service brakes. Then in block 334*d*, processor 112*d* receives a pressure profile in service brake line 14, via sensor interface 122*d* and pressure sensor 132*d*, in response to application of the service brakes. The pressure profile is stored in memory, such as memory 116*d*, as shown in block 336*d*. The process proceeds to block 338*d*.

In block 338*d*, an estimation is made of a first combination of total length and number of trailers coupled to the tractor 100 based upon the pressure profile received. The process then proceeds to block 370*d* in which solenoid valve 152*d* is actuated to provide a pressure change in the service brake line 14 before proceeding to block 372*d*.

In block 372*d*, processor 112*d* receives a reflected pressure change in the service brake line 14, via sensor interface 122*d* and pressure sensor 132*d*, in response to the applied pressure change in the service brake line 14. The reflected pressure change is stored in memory, such as memory 116*d*, as shown in block 374*d*. The process proceeds to block 376*d*.

In block 376*d*, an estimation is made of a second combination of total length and number of trailers coupled to the tractor 100 based upon the reflected pressure change received. The process then proceeds to block 378*d* in which an improved estimation of total length and number of trailers coupled to the tractor 100 is provided. The improved estimation is based upon the first and second combinations of total length and number of trailers.

The improved estimation of total length and number of trailers may be presented via driver interface 140*d* as trailer length/number signal 144*d* to a display in the vehicle driver compartment for the vehicle driver to view. Trailer length/number signal 144*d* may also be communicated to other vehicle controllers, such as the brake controller 16 (FIG. 1), to enable tractor braking as well as trailer braking to be adjusted based upon the combination of total length and number of trailers coupled to the tractor 100, as indicated by trailer length/number signal 144*d*. The process of control logic 114*d* for tractor controller 110*d* then ends.

Figure 2E:
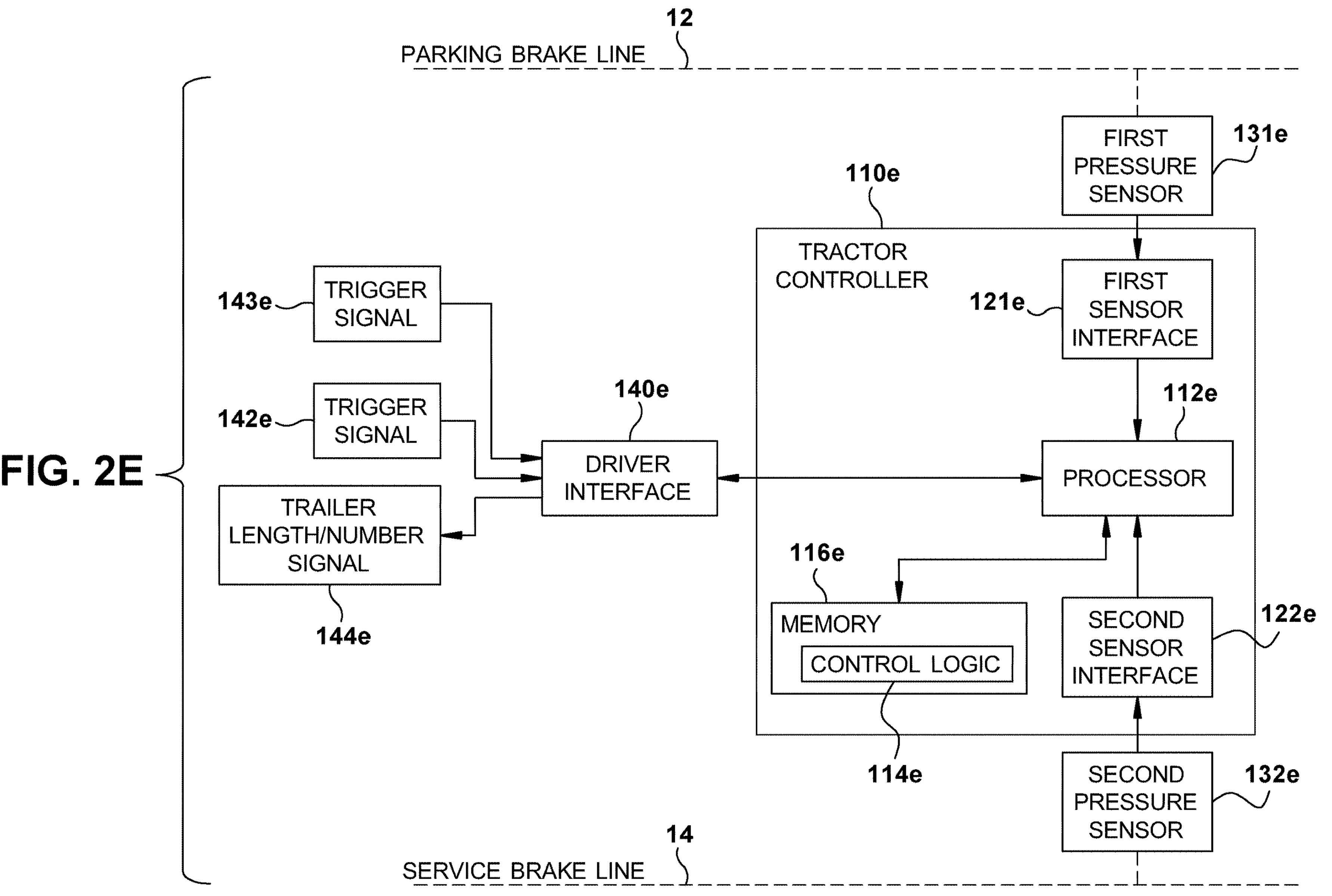

Referring to FIG. 2E, a schematic block diagram of an example tractor controller 110*e* (corresponding to tractor controller 110 of FIG. 1) in accordance with another embodiment is illustrated. FIG. 2E shows a variation of tractor controller 110*a* and tractor controller 110*b* shown in FIGS. 2A and 2B, respectively. Since the embodiment illustrated in FIG. 2E is generally similar to the embodiments illustrated in FIGS. 2A and 2B, similar numerals are utilized to designate similar components, the suffix letter "e" being associated with the embodiment of FIG. 2E to avoid confusion.

Components of tractor controller 110*e* of FIG. 2E comprise components of tractor controller 110*a* of FIG. 2A and components of tractor controller 110*b* of FIG. 2B. Components of tractor controller 110*a* of FIG. 2A and components of tractor controller 110*b* of FIG. 2B have been described hereinabove. Accordingly, components of tractor controller 110*e* of FIG. 2E will not be described.

Figure 3E:
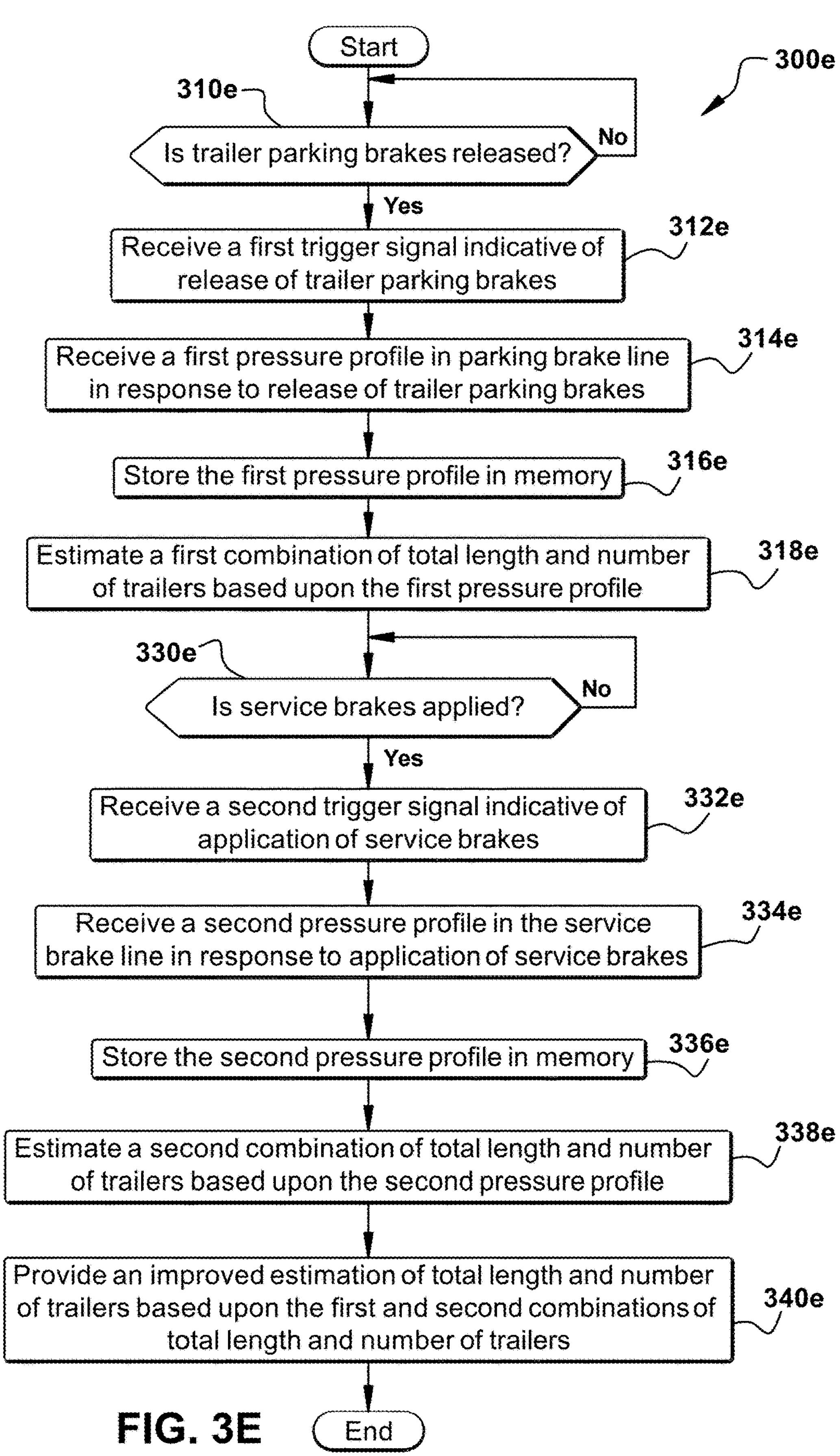

Referring to FIG. 3E, flow diagram 300*e* corresponds to the schematic block diagram of FIG. 2E, and depicts a method of operating tractor controller 110*e* of FIG. 2E in accordance with an embodiment. In block 310*e*, a determination is made as to whether trailer parking brakes of the vehicle train 1 is released. If the determination in block 310*e* is negative, the process returns loops back on itself to continue monitoring for a release of the trailer parking brakes. However, if the determination in block 310*e* is affirmative, the process proceeds to block 312*e*.

In block 312*e*, processor 112*e* receives first trigger signal 142*e* via driver interface 140*e* indicative of release of the trailer parking brakes. Then in block 314*e*, processor 112*e* receives a first pressure profile in parking brake line 12, via first sensor interface 121*e* and pressure sensor 131*e*, in response to release of the trailer parking brakes. The first pressure profile is stored in memory, such as memory 116*e*, as shown in block 316*e*. The process proceeds to block 318*e*.

In block 318*e*, an estimation is made of a first combination of total length and number of trailers coupled to the tractor 100 based upon the first pressure profile received. The process proceeds to block 330*e*.

In block 330*e*, a determination is made as to whether service brakes of the vehicle train 1 is applied. If the determination in block 330*e* is negative, the process returns loops back on itself to continue monitoring for an application of the service brakes. However, if the determination in block 330*e* is affirmative, the process proceeds to block 332*e*.

In block 332*e*, processor 112*e* receives second trigger signal 143*e* via driver interface 140*e* indicative of application of the service brakes. Then in block 334*e*, processor 112*e* receives a second pressure profile in service brake line 14, via second sensor interface 122*e* and second pressure sensor 132*e*, in response to application of the service brakes. The second pressure profile is stored in memory, such as memory 116*e*, as shown in block 336*e*. The process proceeds to block 338*e*.

In block 338*e*, an estimation is made of a second combination of total length and number of trailers coupled to the tractor 100 based upon the second pressure profile received. The process proceeds to block 340*e*. In block 340*e*, an improved estimation of total length and number of trailers is calculated. The improved estimation is calculated based upon the first and second combinations.

The improved estimation of total length and number of trailers may be presented via driver interface 140*e* as trailer length/number signal 144*e* to a display in the vehicle driver compartment for the vehicle driver to view. Trailer length/number signal 144*c* may also be communicated to other vehicle controllers, such as the brake controller 16 (FIG. 1), to enable tractor braking as well as trailer braking to be adjusted based upon the improved estimation of total length and number of trailers coupled to the tractor 100, as indicated by trailer length/number signal 144*e*. The process of control logic 114*e* for tractor controller 110*e* then ends.

Figure 2F:
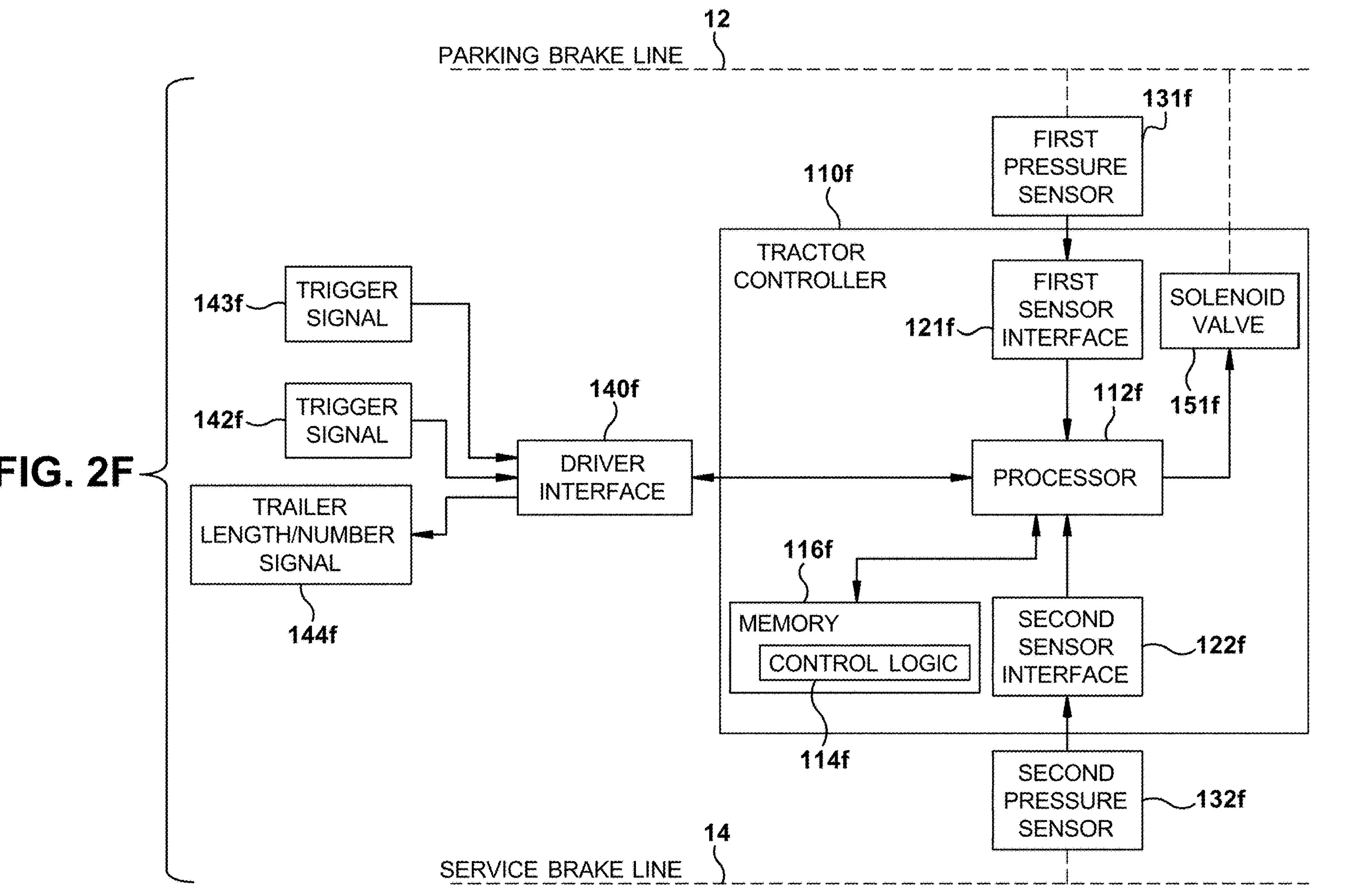

Referring to FIG. 2F, a schematic block diagram of an example tractor controller 110*f* (corresponding to tractor controller 110 of FIG. 1) in accordance with another embodiment is illustrated. FIG. 2F shows a variation of tractor controller 110*b* and tractor controller 110*c* shown in FIGS. 2B and 2C, respectively. Since the embodiment illustrated in FIG. 2F is generally similar to the embodiments illustrated in FIGS. 2B and 2C, similar numerals are utilized to designate similar components, the suffix letter "f" being associated with the embodiment of FIG. 2F to avoid confusion.

Components of tractor controller 110*f* of FIG. 2F comprise components of tractor controller 110*b* of FIG. 2B and components of tractor controller 110*c* of FIG. 2C. Components of tractor controller 110*b* of FIG. 2B and components of tractor controller 110*c* of FIG. 2C have been described hereinabove. Accordingly, components of tractor controller 110*f* of FIG. 2F will not be described.

Figure 3F:
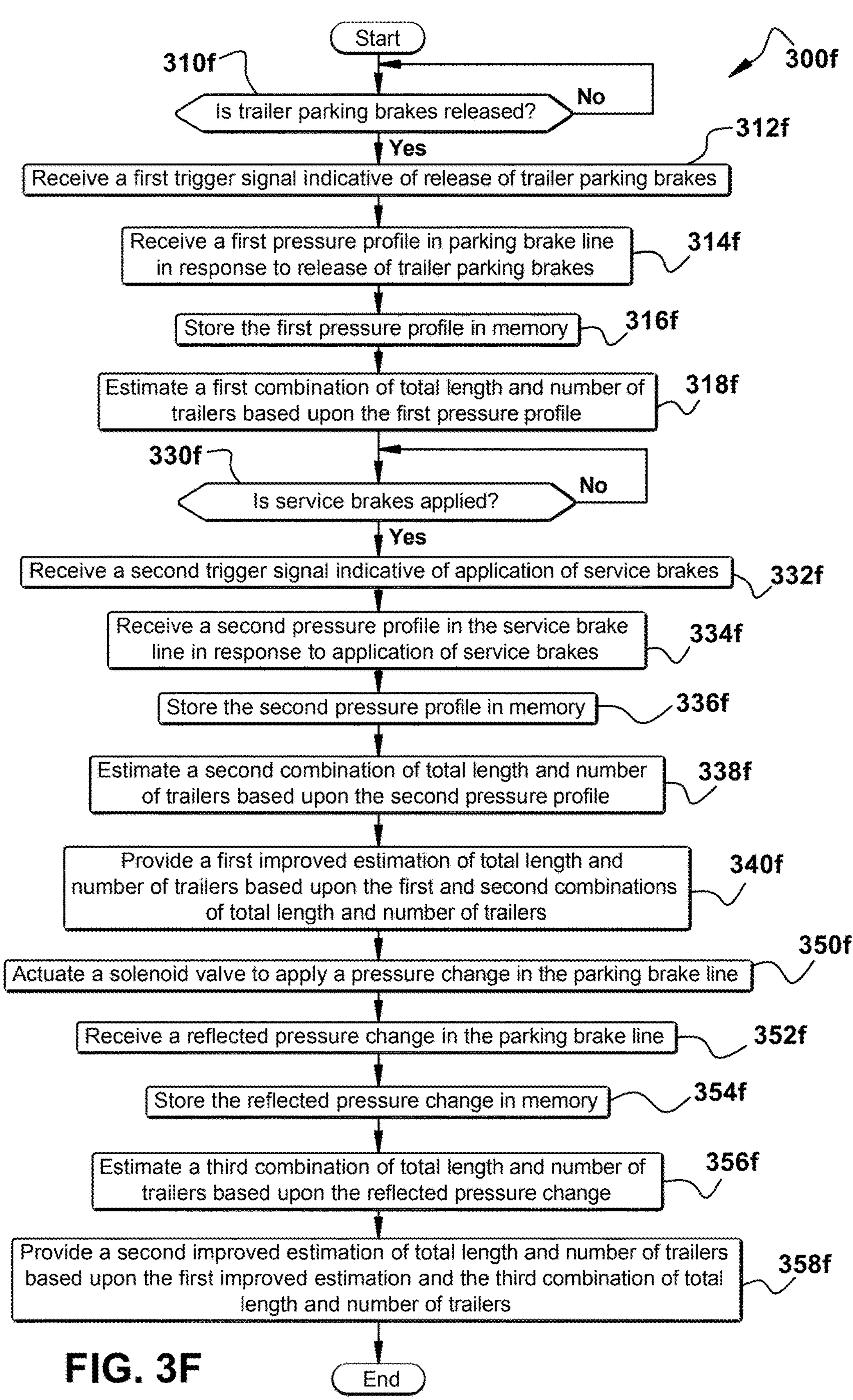

Referring to FIG. 3F, flow diagram 300*f* corresponds to the schematic block diagram of FIG. 2F, and depicts a method of operating tractor controller 110*f* of FIG. 2F in accordance with an embodiment. In block 310*f*, a determination is made as to whether trailer parking brakes of the vehicle train 1 is released. If the determination in block 310*f* is negative, the process returns loops back on itself to continue monitoring for a release of the trailer parking brakes. However, if the determination in block 310*f* is affirmative, the process proceeds to block 312*f*.

In block 312*f*, processor 112*f* receives first trigger signal 142*f* via driver interface 140*f* indicative of release of the trailer parking brakes. Then in block 314*f*, processor 112*f* receives a first pressure profile in parking brake line 12, via first sensor interface 121*f* and pressure sensor 131*f*, in response to release of the trailer parking brakes. The first pressure profile is stored in memory, such as memory 116*f*, as shown in block 316*f*. The process proceeds to block 318*f*.

In block 318*f*, an estimation is made of a first combination of total length and number of trailers coupled to the tractor 100 based upon the first pressure profile received. The process proceeds to block 330*f*.

In block 330*f*, a determination is made as to whether service brakes of the vehicle train 1 is applied. If the determination in block 330*f* is negative, the process returns loops back on itself to continue monitoring for an application of the service brakes. However, if the determination in block 330*f* is affirmative, the process proceeds to block 332*f*.

In block 332*f*, processor 112*f* receives second trigger signal 143*f* via driver interface 140*e* indicative of application of the service brakes. Then in block 334*f*, processor 112*f* receives a second pressure profile in service brake line 14, via second sensor interface 122*f* and second pressure sensor 132*f*, in response to application of the service brakes. The second pressure profile is stored in memory, such as memory 116*f*, as shown in block 336*f*. The process proceeds to block 338*f*.

In block 338*f*, an estimation is made of a second combination of total length and number of trailers coupled to the tractor 100 based upon the second pressure profile received. The process proceeds to block 340*f*. In block 340*f*, a first improved estimation of total length and number of trailers is calculated. The improved estimation is calculated based upon the first and second combinations. The process proceeds to block 350*f*.

In block 350*f*, solenoid valve 151*f* is actuated to apply a pressure change in the parking brake line 12 before proceeding to block 352*f*. In block 352*f*, processor 112*f* receives a reflected pressure change in the parking brake line 12, via sensor interface 121*f* and pressure sensor 131*f*, in response to the applied pressure change in the parking brake line 12. The reflected pressure change is stored in memory, such as memory 116*f*, as shown in block 354*f*. The process proceeds to block 356*f*.

In block 356*f*, an estimation is made of a third combination of total length and number of trailers coupled to the tractor 100 based upon the reflected pressure change received. The process then proceeds to block 358*f* in which a second improved estimation of total length and number of trailers coupled to the tractor 100 is provided. The second improved estimation is based upon the first improved estimation and the third combination of total length and number of trailers.

The second improved estimation of total length and number of trailers may be presented via driver interface 140*f* as trailer length/number signal 144*f* to a display in the vehicle driver compartment for the vehicle driver to view. Trailer length/number signal 144*f* may also be communicated to other vehicle controllers, such as the brake controller 16 (FIG. 1), to enable tractor braking as well as trailer braking to be adjusted based upon the combination of total length and number of trailers coupled to the tractor 100, as indicated by trailer length/number signal 144*f*. The process of control logic 114*f* for tractor controller 110*f* then ends.

Figure 2G:
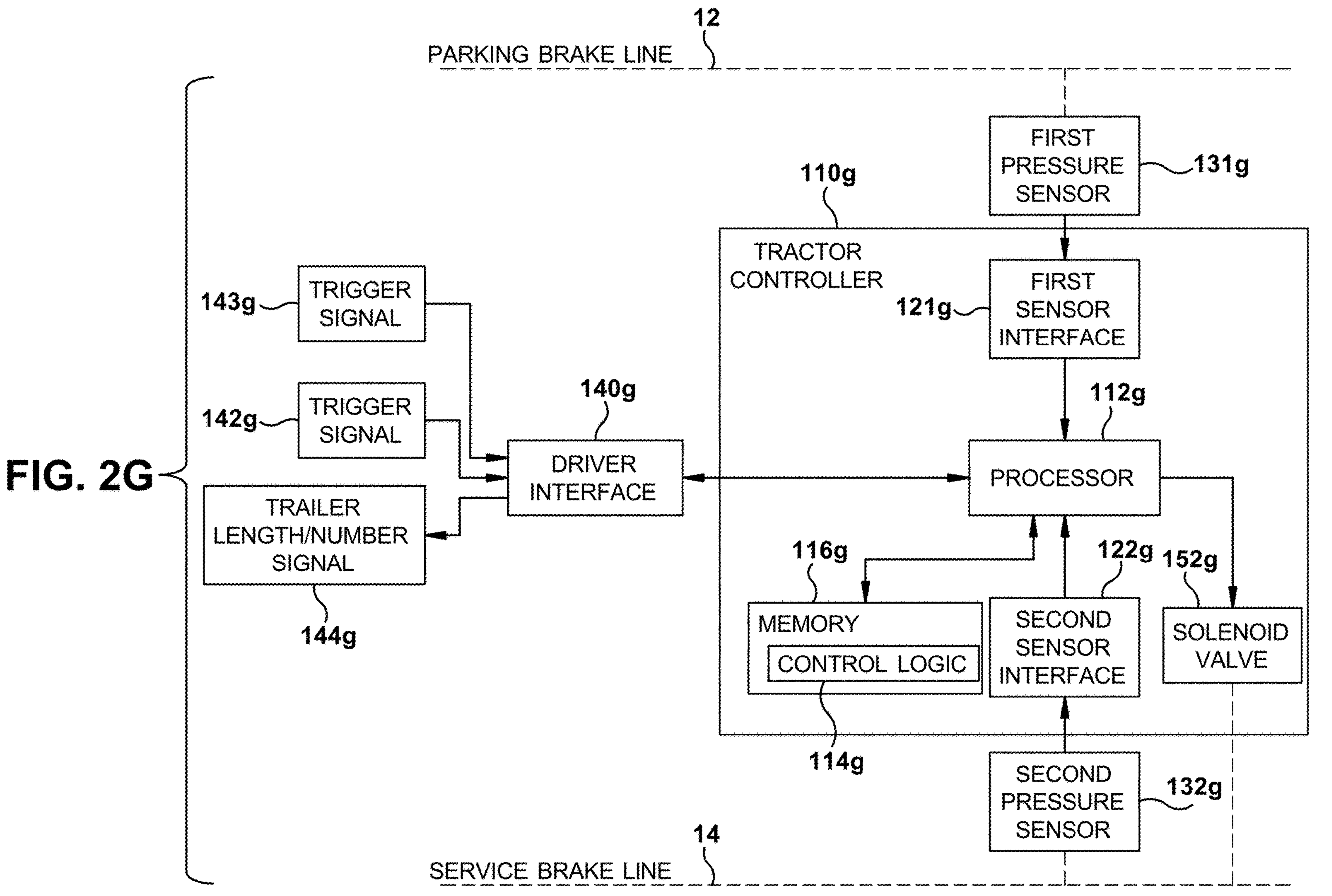

Referring to FIG. 2G, a schematic block diagram of an example tractor controller 110*g* (corresponding to tractor controller 110 of FIG. 1) in accordance with another embodiment is illustrated. FIG. 2F shows a variation of tractor controller 110*a* and tractor controller 110*d* shown in FIGS. 2A and 2D, respectively. Since the embodiment illustrated in FIG. 2G is generally similar to the embodiments illustrated in FIGS. 2A and 2D, similar numerals are utilized to designate similar components, the suffix letter "g" being associated with the embodiment of FIG. 2G to avoid confusion.

Components of tractor controller 110*g* of FIG. 2G comprise components of tractor controller 110*a* of FIG. 2A and components of tractor controller 110*d* of FIG. 2D. Components of tractor controller 110*a* of FIG. 2A and components of tractor controller 110*d* of FIG. 2D have been described hereinabove. Accordingly, components of tractor controller 110*g* of FIG. 2G will not be described.

Figure 3G:
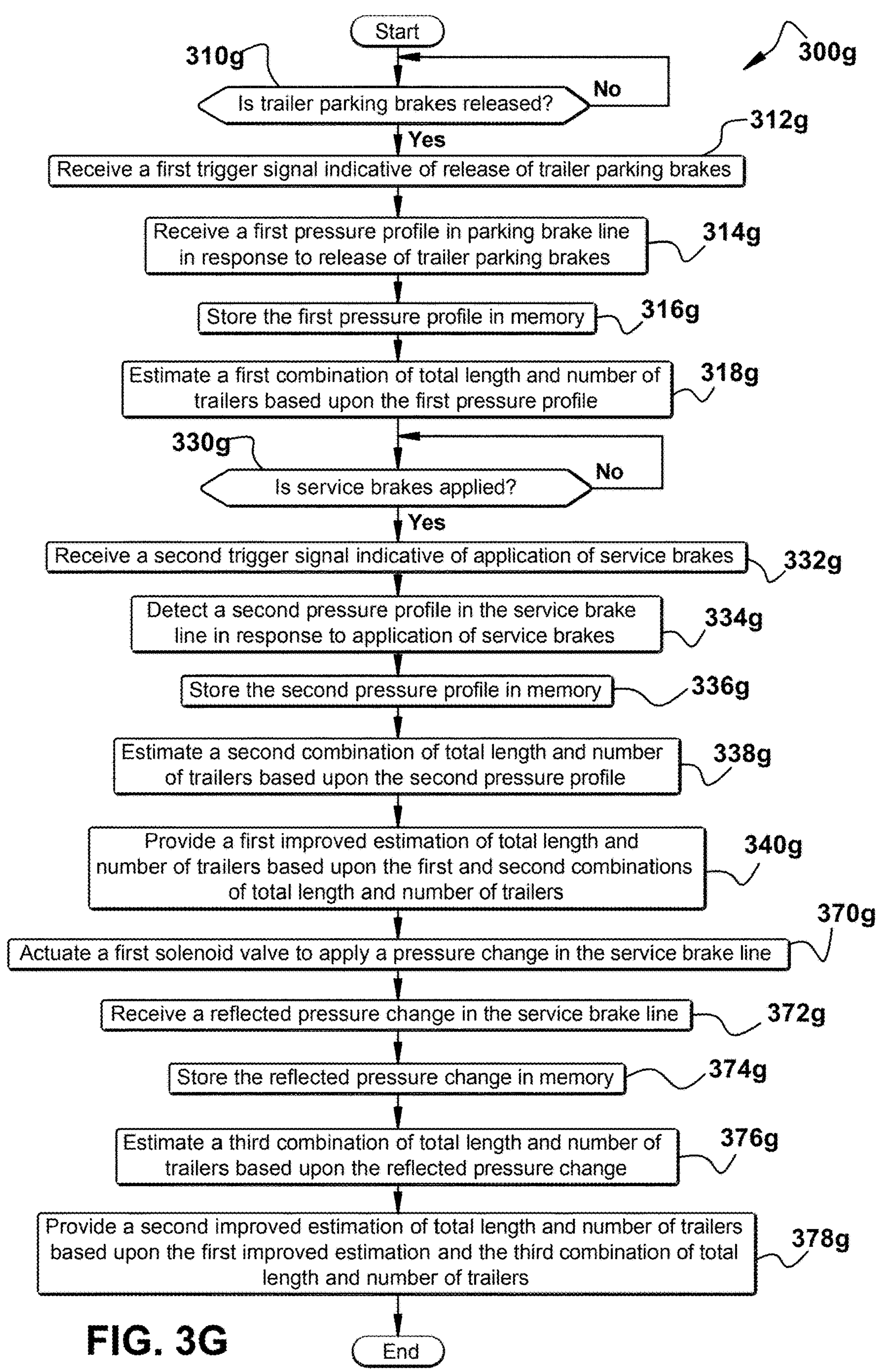

Referring to FIG. 3G, flow diagram 300*g* corresponds to the schematic block diagram of FIG. 2G, and depicts a method of operating tractor controller 110*g* of FIG. 2G in accordance with an embodiment. In block 310*g*, a determination is made as to whether trailer parking brakes of the vehicle train 1 is released. If the determination in block 310*g* is negative, the process returns loops back on itself to continue monitoring for a release of the trailer parking brakes. However, if the determination in block 310*g* is affirmative, the process proceeds to block 312*g*.

In block 312*g*, processor 112*g* receives first trigger signal 142*g* via driver interface 140*g* indicative of release of the trailer parking brakes. Then in block 314*g*, processor 112*g* receives a first pressure profile in parking brake line 12, via first sensor interface 121*g* and pressure sensor 131*g*, in response to release of the trailer parking brakes. The first pressure profile is stored in memory, such as memory 116*g*, as shown in block 316*g*. The process proceeds to block 318*g*.

In block 318*g*, an estimation is made of a first combination of total length and number of trailers coupled to the tractor 100 based upon the first pressure profile received. The process proceeds to block 330*g*.

In block 330*g*, a determination is made as to whether service brakes of the vehicle train 1 is applied. If the determination in block 330*g* is negative, the process returns loops back on itself to continue monitoring for an application of the service brakes. However, if the determination in block 330*g* is affirmative, the process proceeds to block 332*g*.

In block 332*g*, processor 112*g* receives second trigger signal 143*g* via driver interface 140*g* indicative of application of the service brakes. Then in block 334*g*, processor 112*g* receives a second pressure profile in service brake line 14, via second sensor interface 122*g* and second pressure sensor 132*g*, in response to application of the service brakes. The second pressure profile is stored in memory, such as memory 116*g*, as shown in block 336*g*. The process proceeds to block 338*g*.

In block 338*g*, an estimation is made of a second combination of total length and number of trailers coupled to the tractor 100 based upon the second pressure profile received. The process proceeds to block 340*g*. In block 340*g*, a first improved estimation of total length and number of trailers is calculated. The first improved estimation is calculated based upon the first and second combinations. The process proceeds to block 370*g*.

In block 370*g*, solenoid valve 152*g* is actuated to provide a pressure change in the service brake line 14 before proceeding to block 372*g*. In block 372*g*, processor 112*g* receives a reflected pressure change in the service brake line 14, via sensor interface 122*g* and pressure sensor 132*g*, in response to the applied pressure change in the service brake line 14. The reflected pressure change is stored in memory, such as memory 116*g*, as shown in block 374*g*. The process proceeds to block 376*g*.

In block 376*g*, an estimation is made of a third combination of total length and number of trailers coupled to the tractor 100 based upon the reflected pressure change received. The process then proceeds to block 378*g* in which a second improved estimation of total length and number of trailers coupled to the tractor 100 is provided. The second improved estimation is based upon the first improved estimation and the third combination of total length and number of trailers.

The second improved estimation of total length and number of trailers may be presented via driver interface 140*g* as trailer length/number signal 144*g* to a display in the vehicle driver compartment for the vehicle driver to view. Trailer length/number signal 144*g* may also be communicated to other vehicle controllers, such as the brake controller 16 (FIG. 1), to enable tractor braking as well as trailer braking to be adjusted based upon the combination of total length and number of trailers coupled to the tractor 100, as indicated by trailer length/number signal 144*g*.

The second improved estimation of total length and number of trailers may be presented via driver interface 140*g* as trailer length/number signal 144*g* to a display in the vehicle driver compartment for the vehicle driver to view. Trailer length/number signal 144*g* may also be communicated to other vehicle controllers, such as the brake controller 16 (FIG. 1), to enable tractor braking as well as trailer braking to be adjusted based upon the improved estimation of total length and number of trailers coupled to the tractor 100, as indicated by trailer length/number signal 144*g*. The process of control logic 114*g* for tractor controller 110*g* then ends.

Figure 2H:
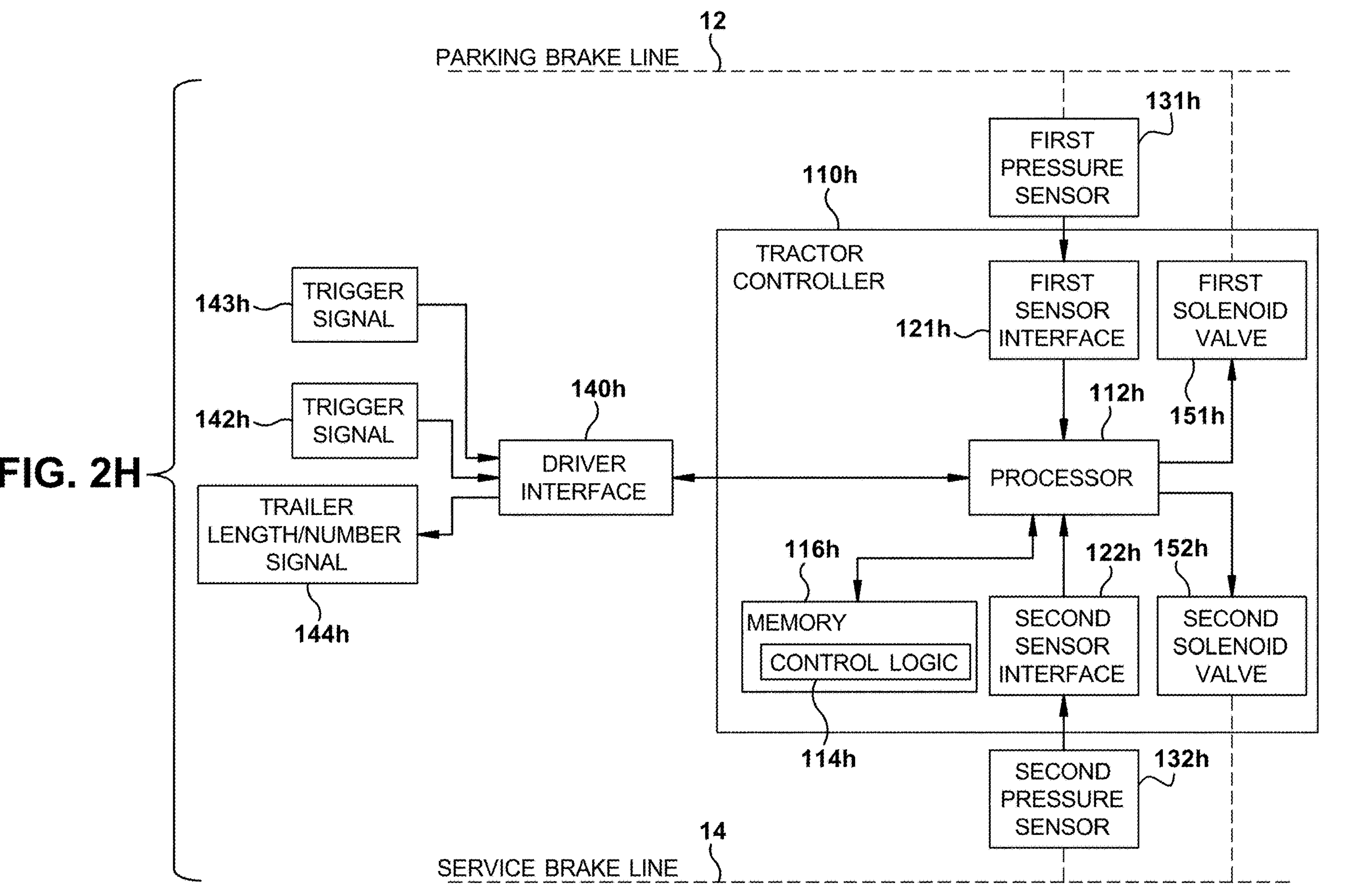

Referring to FIG. 2H, a schematic block diagram of an example tractor controller 110*h* (corresponding to tractor controller 110 of FIG. 1) in accordance with another embodiment is illustrated. FIG. 2H shows a variation of tractor controller 110*f* and tractor controller 110*g* shown in FIGS. 2F and 2G, respectively. Since the embodiment illustrated in FIG. 2H is generally similar to the embodiments illustrated in FIGS. 2F and 2G, similar numerals are utilized to designate similar components, the suffix letter "h" being associated with the embodiment of FIG. 2H to avoid confusion.

Components of tractor controller 110*h* of FIG. 2H comprise components of tractor controller 110*f* of FIG. 2F and components of tractor controller 110*g* of FIG. 2G. Components of tractor controller 110*f* of FIG. 2F and components of tractor controller 110*g* of FIG. 2G have been described hereinabove. Accordingly, components of tractor controller 110*h* of FIG. 2H will not be described.

Figure 3H:
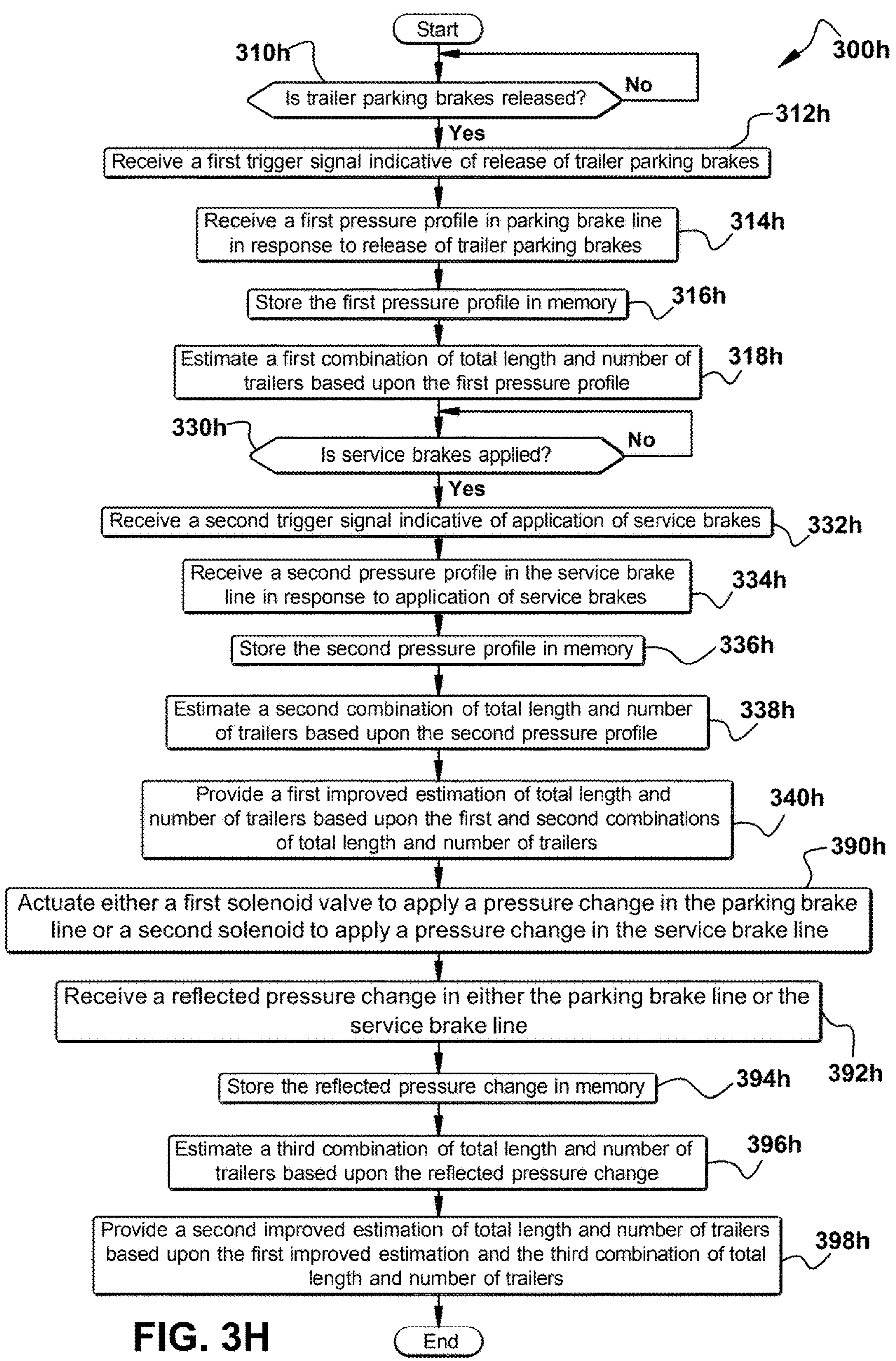

Referring to FIG. 3H, flow diagram 300*h* corresponds to the schematic block diagram of FIG. 2H, and depicts a method of operating the brake control apparatus 10 of FIG. 1 in accordance with an embodiment. In block 310*h*, a determination is made as to whether trailer parking brakes of the vehicle train 1 is released. If the determination in block 310*h* is negative, the process returns loops back on itself to continue monitoring for a release of the trailer parking brakes. However, if the determination in block 310*h* is affirmative, the process proceeds to block 312*h*.

In block 312*h*, processor 112*h* receives first trigger signal 142*h* via driver interface 140*h* indicative of release of the trailer parking brakes. Then in block 314*h*, processor 112*h* receives a first pressure profile in parking brake line 12, via first sensor interface 121*h* and pressure sensor 131*h*, in response to release of the trailer parking brakes. The first pressure profile is stored in memory, such as memory 116*h*, as shown in block 316*h*. The process proceeds to block 318*h*.

In block 318*h*, an estimation is made of a first combination of total length and number of trailers coupled to the tractor 100 based upon the first pressure profile received. The process proceeds to block 330*h*.

In block 330*h*, a determination is made as to whether service brakes of the vehicle train 1 is applied. If the determination in block 330*h* is negative, the process returns loops back on itself to continue monitoring for an application of the service brakes. However, if the determination in block 330*h* is affirmative, the process proceeds to block 332*h*.

In block 332*h*, processor 112*h* receives second trigger signal 143*h* via driver interface 140*h* indicative of application of the service brakes. Then in block 334*h*, processor 112*h* receives a second pressure profile in service brake line 14, via second sensor interface 122*h* and second pressure sensor 132*h*, in response to application of the service brakes. The second pressure profile is stored in memory, such as memory 116*h*, as shown in block 336*h*. The process proceeds to block 338*h*.

In block 338*h*, an estimation is made of a second combination of total length and number of trailers coupled to the tractor 100 based upon the second pressure profile received. The process proceeds to block 340*h*. In block 340*h*, a first improved estimation of total length and number of trailers is calculated. The first improved estimation is calculated based upon the first and second combinations. The process then proceeds to block 390*h*.

In block 390*h*, either first solenoid valve 151*h* or second solenoid valve 152*h* is actuated to provide a corresponding pressure change in the parking brake line 12 or the service brake line 14 before proceeding to block 392*h*. In block 392*h*, processor 112*g* receives a reflected pressure change in either the parking brake line 12 via first sensor interface 121*h* and first pressure sensor 131*h* or the service brake line 14 via second sensor interface 122*h* and second pressure sensor 132*h*, in response to the applied pressure change. The reflected pressure change is stored in memory, such as memory 116*h*, as shown in block 394*h*. The process proceeds to block 396*h*.

In block 396*h*, an estimation is made of a third combination of total length and number of trailers coupled to the tractor 100 based upon the reflected pressure change received. The process then proceeds to block 398*h* in which a second improved estimation of total length and number of trailers coupled to the tractor 100 is provided. The second improved estimation is based upon the first improved estimation and the third combination of total length and number of trailers.

The second improved estimation of total length and number of trailers may be presented via driver interface 140*h* as trailer length/number signal 144*h* to a display in the vehicle driver compartment for the vehicle driver to view. Trailer length/number signal 144*h* may also be communicated to other vehicle controllers, such as the brake controller 16 (FIG. 1), to enable tractor braking as well as trailer braking to be adjusted based upon the combination of total length and number of trailers coupled to the tractor 100, as indicated by trailer length/number signal 144*h*. The process of control logic 114*h* for tractor controller 110*h* then ends.

Figure 2I:
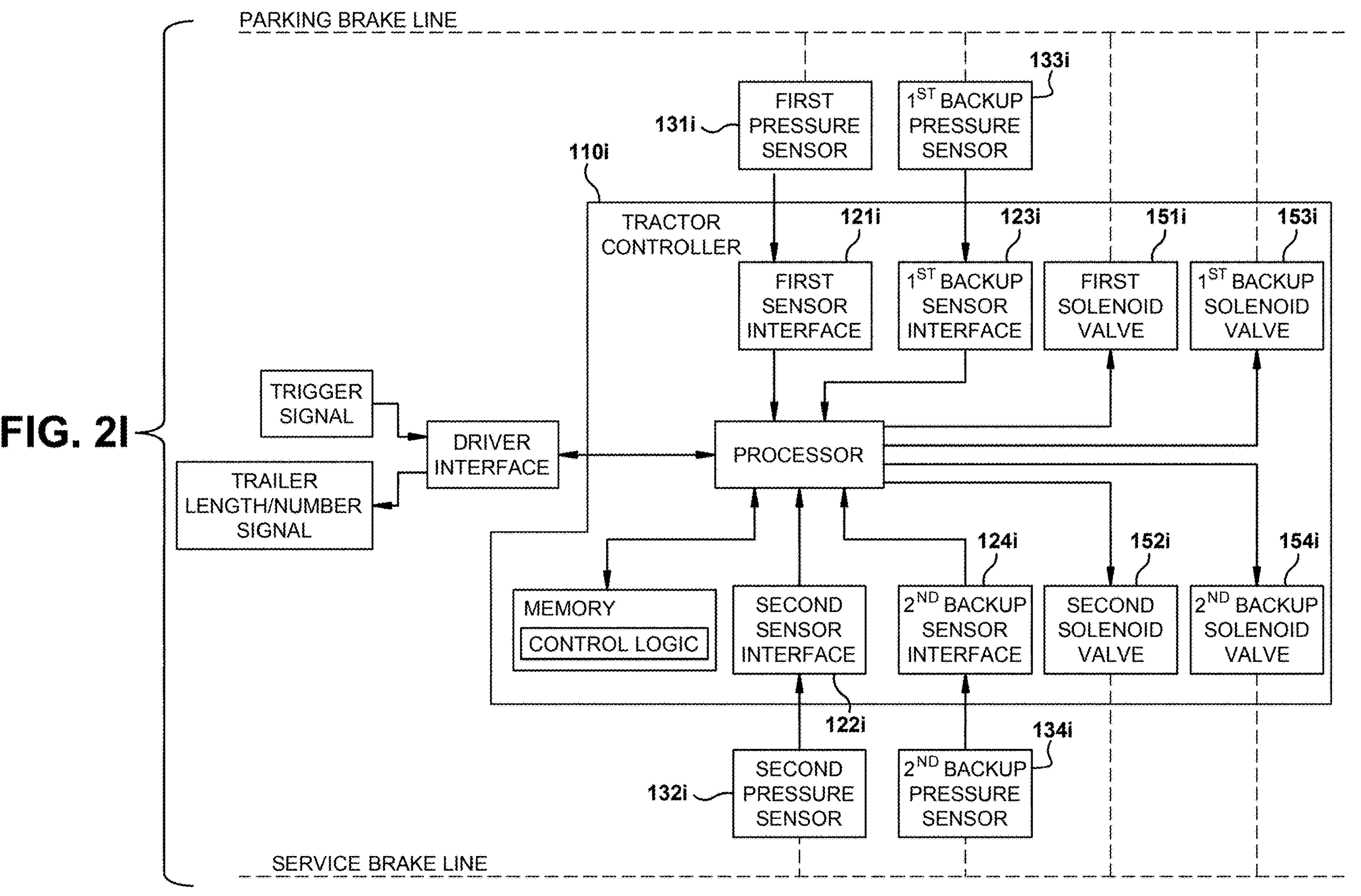

Referring to FIG. 2I, a schematic block diagram of an example tractor controller 110*i* (corresponding to tractor controller 110 of FIG. 1) in accordance with another embodiment is illustrated. FIG. 2I shows a variation of tractor controller 110*h* shown in FIG. 2H. Since the embodiment illustrated in FIG. 2I is generally similar to the embodiment illustrated in FIG. 2H, similar numerals are utilized to designate similar components, the suffix letter "i" being associated with the embodiment of FIG. 2I to avoid confusion.

Tractor controller 110*i* of FIG. 2I comprises components of tractor controller 110*h* of FIG. 2H and additional backup components. Components of tractor controller 110*h* of FIG. 2H have been described hereinabove. The additional backup components shown in FIG. 2I include first backup sensor interface 123*i* which is backup to first sensor interface 121*i*, and second backup sensor interface 124*i* which is backup to second sensor interface 122*i*. The additional backup components shown in FIG. 2I further include first backup pressure sensor 133*i* which is backup to first pressure sensor 131*i*, and second backup pressure sensor 134*i* which is backup to second pressure sensor 132*i*. The additional backup components shown in FIG. 2I also include first backup solenoid valve 153*i* which is backup to first solenoid valve 151*i*, and second backup solenoid valve 154*i* which is backup to second solenoid valve 152*i*. Any combination of the additional backup components shown in FIG. 2I may be implemented. Additional backup components other than those shown in FIG. 2I are possible.

Figure 4:
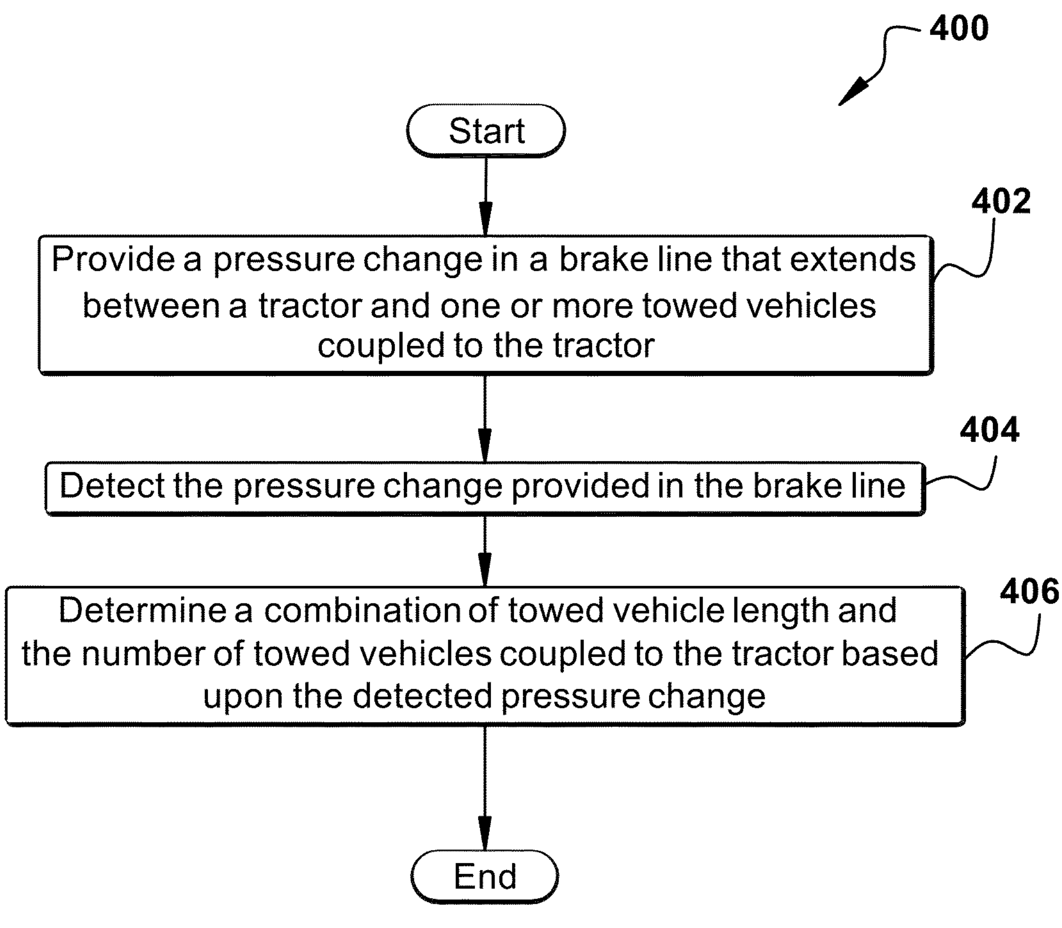
FIG. 4 is a flow diagram depicting a method of operating the vehicle train of FIG. 1 in accordance with an embodiment.

Referring to FIG. 4, flow diagram 400 depicts a method of operating the vehicle train 1 of FIG. 1 in accordance with an embodiment. In block 402, a pressure change is provided in a brake line that extends between the tractor and one or more towed vehicles coupled to the tractor. The process proceeds to block 404 in which the pressure change provided in the brake line is detected. Then in block 406, a determination is made of a combination of towed vehicle length and the number of towed vehicles coupled to the tractor based upon the detected pressure change. The process then ends.

In some embodiments, a pressure pulse is applied in the brake line, and a reflected pressure pulse is detected in the brake line after the pressure pulse has been applied in the brake line. In some embodiments, the applied pressure pulse and the reflected pressure pulse are compared to determine a pressure difference between the applied pressure pulse and the reflected pressure pulse. The pressure difference enables the combination of towed vehicle length and the number of towed vehicles coupled to the tractor to be determined.

In some embodiments, the method is performed by a controller having a memory executing one or more programs of instructions which are tangibly embodied in a program storage medium readable by the controller.

It should be apparent that the tractor controller 110 of FIG. 1 is arranged to detect a pressure change in either the parking brake line 12 or the service brake line 14 in response to a corresponding brake trigger signal. The detected pressure change is used to estimate the number of the towed vehicles or the total length of the number of towed vehicles, or both.

It should also be apparent that the tractor controller 110 of FIG. 1 is arranged to apply a pressure pulse in either the parking brake line 12 or the service brake line 14 using solenoid valves, and then to detect a reflected pressure pulse in the corresponding brake line in response to the applied pressure pulse. The reflected pressure pulse is used to estimate the number of the towed vehicles or the total length of the number of towed vehicles, or both.

A number of advantages result by providing a vehicle with the above-described tractor controller 110. One advantage is that tractor braking and trailer braking, or both, can be adjusted and optimized based upon the actual number of trailers coupled to the tractor. For example, the ability is provided to send braking requests to any number of specific axles or axle groups on any number of specific towed vehicles based upon the actual number of trailers in tow. The result is improved overall braking performance of the vehicle train 1.

Program instructions for enabling each of the tractor controller 110 of FIG. 1 to perform operation steps in accordance with corresponding flow diagrams may be embedded in memory internal to the tractor controller 110. Alternatively, or in addition to, program instructions may be stored in memory external to each respective controller. As an example, program instructions may be stored in memory internal to a different controller of the vehicle. Program instructions may be stored on any type of program storage media including, but not limited to, external hard drives, flash drives, and compact discs. Program instructions may be reprogrammed depending upon features of the particular controller.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of only one controller in the tractor 100, it is conceivable that any number of controllers may be used. Moreover, it is conceivable that any type of controller may be used. Suitable controllers for use in vehicles are known and, therefore, have not been described. Accordingly, the program instructions of the present disclosure can be stored on program storage media associated with one or more vehicle controllers.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A brake control apparatus for a vehicle train having a tractor and one or more towed vehicles coupled to the tractor, the brake control apparatus comprising:

an actuatable first solenoid valve for, when actuated in response to a brake trigger signal, providing a first applied pressure change in at least one brake line of the vehicle train;

a first pressure sensor for sensing a first reflected pressure change in the at least one brake line after the first solenoid valve is actuated to provide the first applied pressure change in the at least one brake line; and a tractor controller arranged to (i) detect the first applied pressure change and the first reflected pressure change in the at least one brake line of the vehicle train in response to the brake trigger signal, and (ii) process a pressure difference between the first applied pressure change and the first reflected pressure change to estimate a combination of a number of the one or more towed vehicles and a total length of the number of one or more towed vehicles coupled to the tractor.

2. The brake control apparatus according to claim 1, wherein the at least one brake line of the vehicle train comprises a combination of a parking brake line and a service brake line.

3. The brake control apparatus according to claim 1, wherein the at least one brake line of the vehicle train comprises a parking brake line associated with the one or more towed vehicles, and the brake trigger signal is provided in response to release of parking brakes associated with the one or more towed vehicles.

4. The brake control apparatus according to claim 1, wherein the at least one brake line of the vehicle train comprises a service brake line associated with the one or more towed vehicles, and the brake trigger signal is provided in response to application of service brakes associated with the one or more towed vehicles.

5. The brake control apparatus according to claim 1, wherein the at least one brake line of the vehicle train comprises a parking brake line associated with the one or more towed vehicles and a service brake line associated with the one or more towed vehicles, and the brake trigger signal is provided in response to either release of parking brakes associated with the one or more towed vehicles or application of service brakes associated with the one or more towed vehicles.

6. The brake control apparatus according to claim 1 further comprising:

the first pressure sensor for sensing the first reflected pressure change is in a first brake line of the at least one brake line of the vehicle train; and a second pressure sensor for sensing a second pressure change is in a second brake line of the at least one brake line of the vehicle train in response to a second brake trigger signal which is different from the first brake trigger signal.

7. The brake control apparatus according to claim 1 further comprising:

an actuatable second solenoid valve for, when actuated, providing a second pressure change in a second brake line of the at least one brake line of the vehicle train; and a second pressure sensor for sensing a second reflected pressure change in the second brake line after the second solenoid valve is actuated to provide the second pressure change in the second brake line.

8. The brake control apparatus according to claim 6 further comprising:

an actuatable second solenoid valve for, when actuated, providing a second pressure change in the first brake line, wherein the first solenoid valve acts as a primary solenoid valve and the second solenoid valve acts as a secondary solenoid valve backing up the primary solenoid valve.

9. The brake control apparatus according to claim 8 further comprising:

a second pressure sensor for sensing a second reflected pressure change in the first brake line, wherein the first pressure sensor acts as a primary pressure sensor and the second pressure sensor acts as a secondary pressure sensor backing up the primary pressure sensor.

10. A brake control apparatus for a vehicle train having a tractor and one or more towed vehicles coupled to the tractor, the brake control apparatus comprising:

a brake line extending between the tractor and the one or more towed vehicles; and a tractor controller arranged to (i) apply an applied pressure pulse in the brake line, (ii) detect a reflected pressure pulse in the brake line in response to the applied pressure pulse, and (iii) determine a number of the one or more towed vehicles coupled to the tractor based upon a difference between the reflected pressure pulse and the applied pressure pulse detected in the brake line.

11. The brake control apparatus according to claim 10, wherein the brake line extending between the tractor and the one or more towed vehicles comprises a select one of a parking brake line and a service brake line.

12. The brake control apparatus according to claim 10, wherein the tractor controller is arranged to process the difference between the reflected pressure pulse and the applied pressure pulse to determine a total length value that is used to calculate the number of towed vehicles coupled to the tractor.

13. The brake control apparatus according to claim 10 further comprising:

at least one actuatable solenoid valve for, when actuated, applying the applied pressure pulse in the brake line.

14. The brake control apparatus according to claim 13, wherein the at least one actuatable solenoid valve comprises a traction valve of the vehicle train.

15. The brake control apparatus according to claim 10 further comprising:

at least one actuatable solenoid valve for, when actuated, applying the applied pressure pulse in the brake line; and at least one transducer for sensing the reflected pressure pulse in the brake line and providing a signal indicative thereof.

16. The brake control apparatus according to claim 15, wherein (i) the at least one actuatable solenoid valve includes a first solenoid valve that acts as a primary solenoid valve and a second solenoid that acts as a secondary solenoid valve backing up the primary solenoid valve, and (ii) the at least one transducer includes a first pressure sensor that acts as a primary pressure sensor and a second pressure sensor that acts as a secondary pressure sensor backing up the primary pressure sensor.

17. A method of operating a vehicle train having a tractor and one or more towed vehicles coupled to the tractor, the method comprising:

providing a pressure change in a brake line that extends between the tractor and the one or more towed vehicles coupled to the tractor, including applying an applied pressure pulse in the brake line;

detecting the pressure change provided in the brake line, including detecting a reflected pressure pulse in the brake line after the applied pressure pulse has been applied in the brake line;

comparing the applied pressure pulse and the reflected pressure pulse to determine a pressure difference between the pressure pulse and the reflected pressure pulse; and determining a combination of towed vehicle length and a number of the one or more towed vehicles coupled to the tractor based upon the pressure difference.

18. The method according to claim 17, wherein the method is performed by a controller having a memory executing one or more programs of instructions which are tangibly embodied in a program storage medium readable by the controller.

* * * * *